United States Patent
Iijima et al.

(10) Patent No.: US 11,882,208 B2
(45) Date of Patent: Jan. 23, 2024

(54) CHATBOT SYSTEM, INFORMATION PROCESSING APPARATUS, INFORMATION PROCESSING METHOD AND PROGRAM

(71) Applicant: NIPPON TELEGRAPH AND TELEPHONE CORPORATION, Tokyo (JP)

(72) Inventors: Yusuke Iijima, Tokyo (JP); Tetsutaro Kobayashi, Tokyo (JP); Yuto Kawahara, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 26 days.

(21) Appl. No.: 17/619,886

(22) PCT Filed: Jul. 4, 2019

(86) PCT No.: PCT/JP2019/026634
§ 371 (c)(1),
(2) Date: Dec. 16, 2021

(87) PCT Pub. No.: WO2021/001989
PCT Pub. Date: Jan. 7, 2021

(65) Prior Publication Data
US 2022/0368519 A1    Nov. 17, 2022

(51) Int. Cl.
*H04L 9/08* (2006.01)
*H04L 9/06* (2006.01)
(Continued)

(52) U.S. Cl.
CPC .......... *H04L 9/0819* (2013.01); *H04L 9/0618* (2013.01); *H04L 9/0861* (2013.01); *H04L 9/30* (2013.01); *H04L 51/02* (2013.01)

(58) Field of Classification Search
CPC ... H04L 9/0819; H04L 9/0618; H04L 9/0861; H04L 9/30; H04L 51/02
See application file for complete search history.

(56) References Cited

U.S. PATENT DOCUMENTS 10,855,440 B1 * 12/2020 Alwen .................. H04L 9/0894
11,050,723 B1 *  6/2021 Mahdavi ............. H04L 63/0478
(Continued)

FOREIGN PATENT DOCUMENTS

JP    2009-033402 A    2/2009

OTHER PUBLICATIONS

Meekan Scheduling Robot for Slack, <URL: https://slack.com/apps/A0G51AT60-meekan-scheduling>, With English Machine Translation.

(Continued)

*Primary Examiner* — Darshan I Dhruv

(57) ABSTRACT

There is provided a chatbot system including a plurality of user terminals, a chatbot, and a chat server. The chatbot includes a memory and a processor configured to create a message from data which is acquired from an external service, receive, as an input, a list including a user ID of a user terminal which has utilization authority for the data, generate a policy-equipped ciphertext by an encryption algorithm of ciphertext policy attribute-based encryption, and transmit the policy-equipped ciphertext to the chat server, and each of the user terminals includes a memory and a processor configured to receive a policy-equipped ciphertext from the chat server and decrypt the policy-equipped ciphertext using an attribute-equipped secret key which is generated on the basis of a user ID of the user terminal.

6 Claims, 9 Drawing Sheets

(51) Int. Cl.
H04L 9/30 (2006.01)
H04L 51/02 (2022.01)

(56) References Cited

U.S. PATENT DOCUMENTS

| | | | |
|---|---|---|---|
| 2015/0222606 A1* | 8/2015 | Yan | H04L 9/0847 |
| | | | 713/171 |
| 2017/0180284 A1* | 6/2017 | Smullen | H04L 69/14 |
| 2018/0241725 A1* | 8/2018 | Konigsberg | G06F 21/606 |
| 2019/0089798 A1* | 3/2019 | Driscoll | H04L 67/565 |
| 2019/0173811 A1* | 6/2019 | Estrada | H04L 51/02 |
| 2019/0268336 A1* | 8/2019 | Gomi | H04W 12/069 |
| 2019/0317709 A1* | 10/2019 | Sugimoto | G06F 3/1204 |
| 2020/0065523 A1* | 2/2020 | Fukuda | H04L 51/046 |
| 2020/0145203 A1* | 5/2020 | Sun | H04L 9/0836 |

OTHER PUBLICATIONS

T. Okamoto and K. Takashima,"Fully Secure Functional Encryption with General Relations from the Decisional Linear Assumption," CRYPTO 2010.

* cited by examiner

CHATBOT SYSTEM, INFORMATION PROCESSING APPARATUS, INFORMATION PROCESSING METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2019/026634, filed on 4 Jul. 2019, the disclosure of which is hereby incorporated herein by reference in its entirety.

TECHNICAL FIELD

The present invention relates to a chatbot system, an information processing apparatus, an information processing method, and a program.

BACKGROUND ART

Chatbot systems have been known. A chatbot system refers to a system which provides, to a user, data and functions in an external service through exchange of messages (e.g., voice or text) via a chat server. For example, Meekan Scheduling Robot for Slack is known as a chatbot system which operates on Slacks(R) (see, for example, Non-Patent Literature 1).

CITATION LIST

Non-Patent Literature

Non-Patent Literature 1: Meekan Scheduling Robot for Slack, <URL: https://slack.com/apps/A0G51AT60-meekan-scheduling>

SUMMARY OF THE INVENTION

Technical Problem

However, in a conventional chatbot system, even if a different user or chatbot connected to the same chatbot system has no utilization authority for an external service, the user or chatbot may be successful in utilization (e.g., browsing) of data acquired from the external service.

An embodiment of the present invention has been made in view of the above-described point, and has as its object to control utilization of data obtained from an external service in a chatbot system.

Means for Solving the Problem

To achieve the above-described object, a chatbot system according to an embodiment of the present invention is a chatbot system including a plurality of user terminals, a chatbot, and a chat server, wherein the chatbot includes a memory and a processor configured to create a message from data which is acquired from an external service, receive, as an input, a list including a user ID of a user terminal which has utilization authority for the data, generate a policy-equipped ciphertext by an encryption algorithm of ciphertext policy attribute-based encryption, and transmit the policy-equipped ciphertext to the chat server, and each of the user terminals includes a memory and a processor configured to receive a policy-equipped ciphertext from the chat server and decrypt the policy-equipped ciphertext using an attribute-equipped secret key which is generated on the basis of a user ID of the user terminal.

Effects of the Invention

It is possible to control utilization of data obtained from an external service in a chatbot system.

DESCRIPTION OF EMBODIMENTS

An embodiment of the present invention (hereinafter also referred to as the "present embodiment") will be described below. The present embodiment will describe a chatbot system 1 which is capable of controlling utilization of data obtained from an external service. Note that the external service refers to an arbitrary service which is provided by an external service provider. Examples of the external service include various services, such as a customer management service, a scheduling service, a cloud storage service, and a project management service.

<Conventional Chatbot System>

Before describing the chatbot system 1 according to the present embodiment, an overall configuration and operation of a conventional chatbot system, terms generally used for a chatbot system, and the like will be described.

Figure 1:
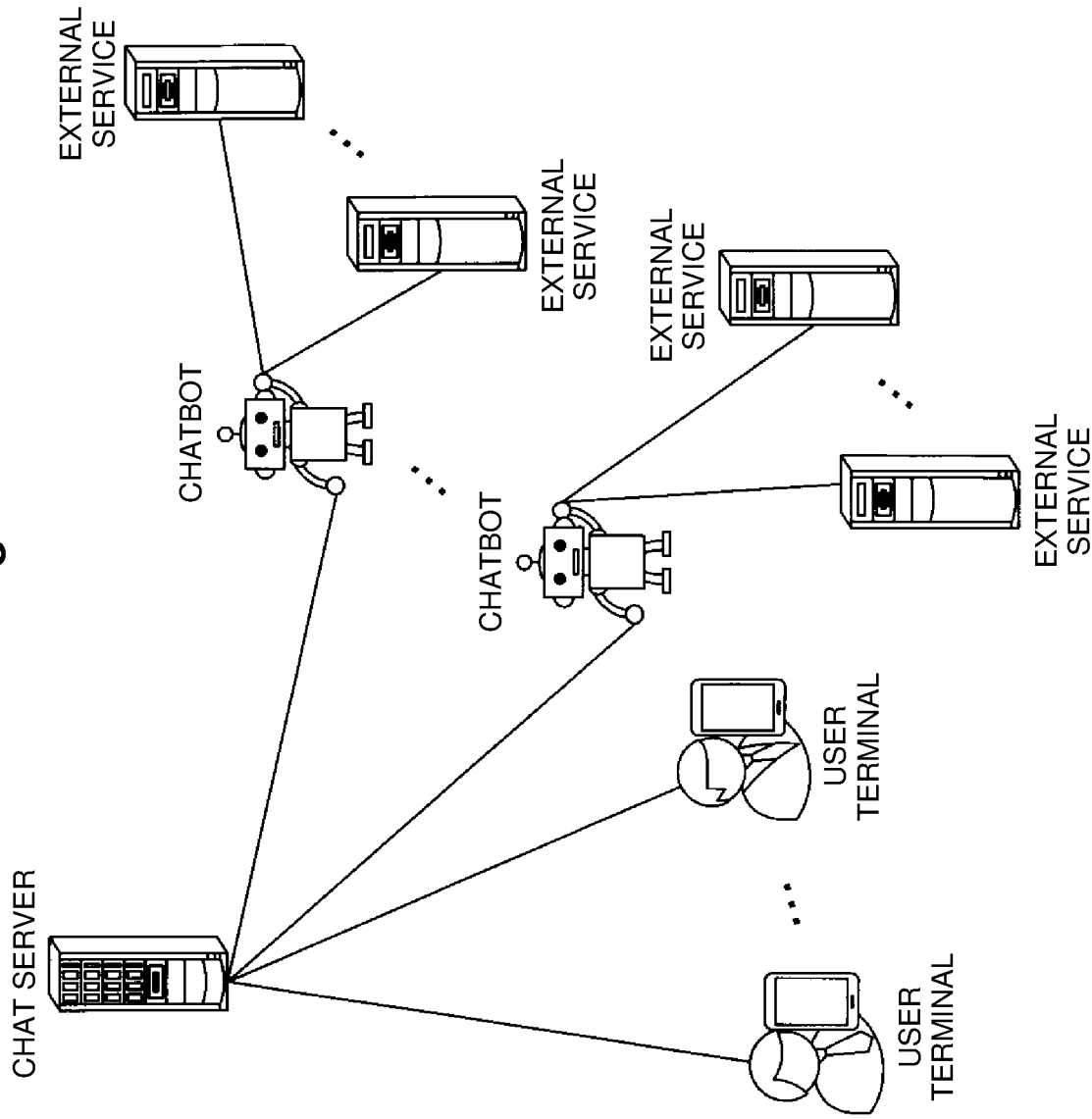
FIG. 1 is a diagram for explaining an example of an overall configuration of a conventional chatbot system.

As shown in FIG. 1, the conventional chatbot system includes a chat server, a plurality of external services, a plurality of chatbots, and a plurality of user terminals. Communication is performed between a chat server and a user terminal, between a chat server and a chatbot, and between a chatbot and an external service. Note that a chatbot refers to, for example, a server or a system loaded with, e.g., a program which functions as a chatbot. An external service refers to a server or a system which provides the service.

For example, a finite code string expressed as, e.g., a name, a phone number, an e-mail address, a nickname, an integer, a random character string, or a combination thereof is uniquely defined for each user terminal (or each user which utilizes a user terminal). The code string is generally called a "user ID."

For example, a finite code string expressed as, e.g., a chatbot name, an integer, a random character string, or the like is uniquely defined for each chatbot. The code string is generally called a "chatbot ID."

User IDs of all the user terminals and chatbot IDs of all the chatbots are saved in each user terminal. Assume hereinafter that the user IDs and the chatbot IDs are $UID_1$ to $UID_N$ and $CID_1$ to $CID_L$, respectively, where N represents the number of all the user terminals and L represents the number of all the chatbots.

For the sake of brevity, a user terminal, for which a user ID of $UID_i$ is defined, will hereinafter also be referred to as a "user terminal $UID_i$," or simply "user $UID_i$," where i=1, . . . , N. Similarly, a chatbot, for which a chatbot ID of $CID_j$ is defined, will also be referred to as a "chatbot $CID_j$," where j=1, . . . , L.

In the above-described case, a process in, for example, a case where the user terminal, for which the user ID of $UID_i$ is defined, transmits a message is as described in following procedural steps 1-1 and 1-2.

Procedural Step 1-1: The user $UID_1$ transmits a message M and its user ID of $UID_1$ to the chat server.

Procedural Step 1-2: When the chat server receives the message M and the user ID of $UID_i$, the chat server transmits the message M and the user ID of $UID_1$ to all the user terminals (i.e., the users $UID_1$ to $UID_N$) and all the chatbots (i.e., the chatbots $CID_1$ to $CID_L$). Note that, at this time, the message M and the user ID of $UID_i$ may not be transmitted to the user $UID_i$.

Similarly, a process in, for example, a case where the chatbot $CID_j$ transmits a message is as described in following procedural steps 2-1 and 2-2.

Procedural Step 2-1: The chatbot $CID_j$ transmits a message M and its chatbot ID of $CID_j$ to the chat server.

Procedural Step 2-2: When the chat server receives the message M and the user ID of $CID_j$, the chat server transmits the message M and the chatbot ID of $CID_1$ to all the user terminals and all the chatbots. Note that, at this time, the message M and the chatbot ID of $CID_j$ may not be transmitted to the chatbot $CID_j$.

Note that, if a chatbot transmits a message, the message may be transmitted only to the user terminals $CID_1$ to $CID_N$ (i.e., the message may not be transmitted to the chatbots $CID_1$ to $CID_L$) in procedural step 2-2, depending on the chatbot system.

Some chat servers have a message saving function, and such chat servers are also called "business chat servers." A business chat server is provided with a table where messages are to be saved. An example of the table is shown in Table 1 below.

TABLE 1

| Message ID | Message | Transmission source |
|---|---|---|
| $MID_1$ | M | $UID_2$ |
| $MID_2$ | M' | $CID_1$ |
| $MID_3$ | M" | $UID_1$ |
| . . . | . . . | . . . |

The business chat server saves a message by adding, to the table, a row in which a message ID for message identification, the message, and a user ID or a chatbot ID of a transmission source are associated, before or after transmitting the message in procedural step 1-2 or 2-2.

To acquire a message saved in the business chat server, the user $UID_i$ (1≤i≤N) transmits a message acquisition request to the business chat server. Examples of the message acquisition request include a request specifying a message ID of an acquisition object, a request to acquire a message containing a particular keyword, and a request for acquisition of all messages.

An external service will be described. Examples of data in the external service include schedule information, customer information, and task information. Examples of a function of the external service include a data browse and edit function, an e-mail transmission and reception function, and a vote function. Generally, only authorized users can utilize data and functions of such an external service.

Processing of an external service to be connected to a chatbot will be described here by taking a data browse function as an example. Usually, an external service identifies a user terminal by an ID different from a user ID for a chatbot system. For this reason, assume that a finite code string expressed as, e.g., an integer, a name, a phone number, an e-mail address, a nickname, a random character string, or a combination thereof is uniquely defined for each user terminal. Similarly, a finite code string expressed as, e.g., a chatbot name, an integer, or a random character string is uniquely defined for each chatbot. Such code strings are called "client IDs."

A plurality of pieces of data are saved in an external service, and a client ID list is defined for each piece of data. If a user terminal (or a chatbot), for which a client ID of OID is defined, has browse authority for data D which is saved in the external service, this means that the client ID of the user terminal (or the chatbot) is registered in a list defined for the data D. The list is not fixed and may be changed over time. For this reason, the user terminal (or chatbot) having the browse authority for the data D may lose the browse authority over time.

A random character string or bit string is uniquely present for each client ID and is saved in chatbots and external services. The random character string or bit string is called "proxy authentication information." For example, OAuth 2.0, <URL: https://tools.ietf.org/html/rfc6749>, is available as a technique for sharing proxy authentication information between a chatbot and an external service.

The user terminal, for which the client ID of OID is defined, has the browse authority for the data D in the external service, and proxy authentication information for the client ID of OID is denoted by "Cert." A process in a case where a chatbot acquires data D is as described in following procedural steps 3-1 and 3-2.

Procedural Step 3-1: The chatbot transmits the client ID of OID, a data acquisition request Req, and the proxy authentication information Cert to the external service.

Procedural Step 3-2: The external service confirms whether Cert is proxy authentication information for OID and confirms whether OID has browse authority for the data D requested by Req. If it is confirmed that Cert is proxy authentication information for OID and that OID has browse authority, the external service transmits the data D to the chatbot. Otherwise, the external service stops processing. Note that, if a plurality of pieces of data are requested by Req, the external service transmits only data, for which OID has browse authority, to the chatbot.

A chatbot operates in the manner below using the above-described chat server and external services. Assume first that $P_i$ external services are connected to the chatbot $CID_i$ ($1 \leq i \leq L$). The external services are denoted by "$S^i_1$," "$S^i_2$," ... "$S^i_{Pi}$," respectively. Also, assume that client IDs which are defined in an external service $S^i_k$ ($1-k-P_i$) are denoted by "$OID^i_{k,1}$" to "$OID^i_{k,N+L}$," respectively.

In each chatbot $CID_i$, a client ID of $OID^i_{k,j}$ corresponding to a user ID of $UID_j$ and a client ID of $OID^i_{k,N+j}$ corresponding to a chatbot ID of $CID_j$ of a chatbot other than the chatbot $CID_i$ are saved for each external service $S^i_k$ using a table or the like. Note that all correspondence relationships are not saved and that there may be a user ID or a chatbot ID, for which a client ID is not saved. Assume that, if correspondence relationships between user IDs and client IDs and correspondence relationships between chatbot IDs and client IDs are saved in a chatbot, proxy authentication information corresponding to a client ID is saved in the chatbot.

For example, an example of a table, storing correspondence relationships between user IDs and client IDs for the external service $S^1_2$, of tables held by the chatbot $CID_1$ is shown in Table 2 below.

TABLE 2

| User ID | Client ID | Proxy authentication information |
|---|---|---|
| $UID_1$ | | |
| $UID_2$ | $OID^1_{2,1}$ | $Cert^1_{2,1}$ |
| $UID_3$ | $OID^1_{2,3}$ | $Cert^1_{2,3}$ |
| ... | ... | ... |

Similarly, for example, an example of a table, storing correspondence relationships between chatbot IDs and client IDs for the external service $S^1_2$, of the tables held by the chatbot $CID_1$ is shown in Table 3 below.

TABLE 3

| Chatbot ID | Client ID | Proxy authentication information |
|---|---|---|
| $CID_2$ | | |
| $CID_3$ | $OID^1_{2,N+3}$ | $Cert^1_{2,N+2}$ |
| ... | ... | ... |

Note that the chatbot $CID_i$ holds, besides Tables 2 and 3 above, a table storing correspondence relationships between user IDs and client IDs and a table storing correspondence relationships between chatbot IDs and client IDs for each external service. Hereinafter, such a table storing correspondence relationships among user IDs (or chatbot IDs), client IDs, and pieces of proxy authentication information will also be referred to as a "proxy authentication information table."

Here, the chatbot $CID_i$ performs a chatbot process on the basis of, for example, the condition that a message M and the user ID of $UID_j$ be received from the chat server, the condition that a message M and the chatbot ID of $CID_j$ be received from the chat server, or the condition that a condition for voluntary activation of a chatbot, such as the condition that a specified time come, be met. In a chatbot process, each of an external service data acquisition process and a message transmission process is executed 0 times, once, or more times in accordance with conditions and a procedure defined in a chatbot.

An external service as a data acquisition destination (i.e., an external service as a data acquisition request transmission destination), a data acquisition request, and the like which are needed as inputs at the time of execution of the external service data acquisition process are set in advance in the chatbot so as to correspond to timing of and conditions for execution of the chatbot process. For example, settings are made in the following manner: the transmission destination external service for the external service data acquisition process to be executed immediately after the start of processing is set to $S^i_k$, and the data acquisition request is set to a fixed value, Req; if a received message contains a particular phrase, the transmission destination external service for the external service data acquisition process is set to $S^i_k$, and the data acquisition request is set to be created on the basis of the message; the transmission destination external service for the external service data acquisition process to be executed after data acquisition from $S^i_k$ is set to $S^i_{k'}$, and the data acquisition request is set to be created on the basis of the data acquired from $S^i_k$; or the like.

Inputs for and processing details of the external service data acquisition process and the message transmission process are illustrated in (1) and (2), respectively, below.

(1) External Service Data Acquisition Process
[Inputs]
Transmission destination external service $S^i_k$
Data acquisition request Req
Client ID of $OID^i_{k,j}$
List DL for data acquired from an external service
[Processing Details]
Procedural Step 4-1: The chatbot $CID_i$ transmits the client ID of $OID^i_{k,j}$, proxy authentication information $Cert^i_{k,j}$ for the client ID of $OID^i_{k,j}$, and the data acquisition request Req to the external service $S^i_k$.

Procedural Step 4-2: When the external service $S^i_k$ receives $OID^i_{k,j}$, $Cert^i_{k,j}$, and Req, the external service $S^i_k$ confirms whether $Cert^i_{k,j}$ is proxy authentication information for $OID^i_{k,j}$ and also confirms whether $OID^i_{k,j}$ has browse authority for data D requested by Req. If affirmative results are obtained, the external service $S^i_k$ transmits the data D to the chatbot $CID_i$.

Procedural Step 4-3: The chatbot $CID_i$ receives D from the external service $S^i_k$.

Procedural Step 4-4: The chatbot $CID_i$ saves D in the list DL.

(2) Message Transmission Process
[Input]
List DL for data acquired from an external service
[Processing Details]
Procedural Step 5-1: The chatbot $CID_i$ selects some pieces of data $D_1'$ to $D_q'$ from the list DL for data acquired from the external service and converts these $D_1'$ to $D_q'$ into a message M' (or creates the message M' from these $D_1'$ to $D_q'$). Note that, if there is no data acquired from the external service (i.e., the list DL is empty), the chatbot $CID_i$ creates the message M' in accordance with a process defined in advance in the chatbot.

Procedural Step 5-2: The chatbot $CID_i$ transmits its chatbot ID of $CID_i$ and the message M' to the chat server.

The chatbot process is as described in following procedural steps 6-1 to 6-4.

Procedural Step 6-1: The chatbot $CID_i$ ($1 \leq i \leq L$) starts the chatbot process.

Procedural Step 6-2: The chatbot $CID_i$ defines one user ID or chatbot ID to be utilized in the chatbot process. For example, if the chatbot process is started with reception of a message M and the user ID of $UID_j$ from the chat server here, the chatbot $CID_i$ defines the received user ID of $UID_j$ as a user ID to be utilized in the chatbot process. If the chatbot process is started with reception of a message M and the chatbot ID of $CID_j$ from the chat server, the chatbot $CID_i$ defines the received chatbot ID of $CID_j$ as a chatbot ID to be utilized in the chatbot process.

Procedural Step 6-3: The chatbot $CID_i$ prepares an empty list DL for saving of external service data to be acquired in the chatbot process and executes each of the external service data acquisition process and the message transmission process 0 times, once, or more times in accordance with conditions and a procedure defined in the chatbot.

Procedural Step 6-4: If the external service data acquisition process is to be executed, the chatbot $CID_i$ determines, as inputs, the transmission destination external service $S^i_k$ and a data acquisition request Req in accordance with settings defined in the chatbot. The chatbot $CID_i$ also uses, as an input, the client ID of $OID^i_{k,j}$ or $OID^i_{k,N+j}$ corresponding to the user ID of $UID_j$ or the chatbot ID of $CID_j$ defined as a client ID in procedural step 6-2 above. Additionally, the chatbot $CID_i$ uses, as an input, the list DL prepared in procedural step 6-3 above. Note that data D acquired from the external service $S^i_k$ is added to the list DL by the external service data acquisition process.

Procedural Step 6-5: If the message transmission process is to be executed, the chatbot $CID_i$ uses, as an input, the list DL for saving of external service data. Note that the chatbot ID of $CID_i$ and a message M' are transmitted to the chat server by the message transmission process.

See, for example, Non-Patent Literature 1 described above for details of the above-described chatbot process.

<Outline of Present Embodiment>

It is necessary that the only user terminals that can browse data of an external service in a chatbot system be basically user terminals having browse authority for the data of the external service. In contrast, in the conventional chatbot system described above, data is acquired from an external service by transmitting a data acquisition request to the external service using proxy authentication information of a user terminal or a chatbot which is a transmitter of a message. That is, a chatbot confirms only whether a user terminal or a chatbot which is a transmitter of a message has browse authority, acquires data from an external service, and performs creation of a message from the acquired data and transmission of the message. Since a chat server uses an existing service, it is impossible to cause the chat server to control a transmission destination. For this reason, in the conventional chatbot system, a user terminal or a chatbot without browse authority for an external service may be successful in browsing data of the external service.

For example, assume that a user terminal $UID_1$, a user terminal $UID_2$, a user terminal $UID_3$, and a chatbot $CID_1$ are connected to a chat server, data $D_1$ is saved in an external service, and that only the user terminals $UID_1$ and $UID_2$ have browse authority for the data $D_1$. In this case, when the user terminal $UID_1$ utilizes the chatbot to share the data $D_1$, all the user terminals become able to browse the data $D_1$. That is, the user terminal $UID_3$ without browse authority for the data $D_1$ can also browse the data $D_1$.

A chatbot system using a business chat server suffers from not only the above-described problem related to browse authority but also the following problem. The problem is that, even after browse authority for data is changed, the data can be utilized. That is, a message obtained by converting data of an external service is saved in the business chat server. In this case, even if browse authority for original data saved in the external service is changed, the change is not reflected in the message saved in the business chat server.

Thus, for example, even if the original data saved in the external service has an expiration date, data contained in the message saved in the business chat server can be browsed for an indefinite period of time. For example, assume that the user terminal $UID_2$ had browse authority for data D of the external service at a certain time point in the past, the authority has been changed, and that the user terminal $UID_2$ no longer has browse authority. Even in this case, the user terminal $UID_2$ can browse data contained in a message saved in a business chat server.

Under the above-described circumstances, the chatbot system 1 according to the present embodiment is configured such that only a user terminal having browse authority for data which is set on the side of an external service can browse the data. If a business chat server is used as a chat server, the chatbot system 1 according to the present embodiment allows browsing of a message (a message generated from data of an external service) saved in the chat server only during a period when browse authority is valid.

To the above-described end, the chatbot system 1 according to the present embodiment utilizes ciphertext policy attribute-based encryption (CP-ABE).

CP-ABE is an encryption scheme in which an attribute of a user is correlated with an attribute-equipped secret key, a decryption condition (policy) is correlated with a policy-equipped ciphertext, and the ciphertext can be decrypted only with a secret key which meets the decryption condition (policy). CP-ABE is composed of a setup algorithm (Setup), a key generation algorithm (KeyGen), an encryption algorithm (Enc), and a decryption algorithm (Dec).

Setup is a probabilistic algorithm which receives, as inputs, an attribute set and a security parameter and outputs a public key and a master secret key.

KeyGen is a probabilistic algorithm which receives, as inputs, a master secret key and an attribute and outputs one attribute-equipped secret key.

Enc is a probabilistic algorithm which receives, as inputs, a public key, a plain text as an encryption object, and a policy and outputs one policy-equipped ciphertext.

Dec is a deterministic algorithm which receives, as inputs, an attribute-equipped secret key and a policy-equipped ciphertext and outputs a plain text.

For details of CP-ABE, see literatures, such as T. Okamoto and K. Takashima, "Fully Secure Functional Encryption with General Relations from the Decisional Linear Assumption," CRYPTO 2010.

<Overall Configuration of Chatbot System 1>

Figure 2:
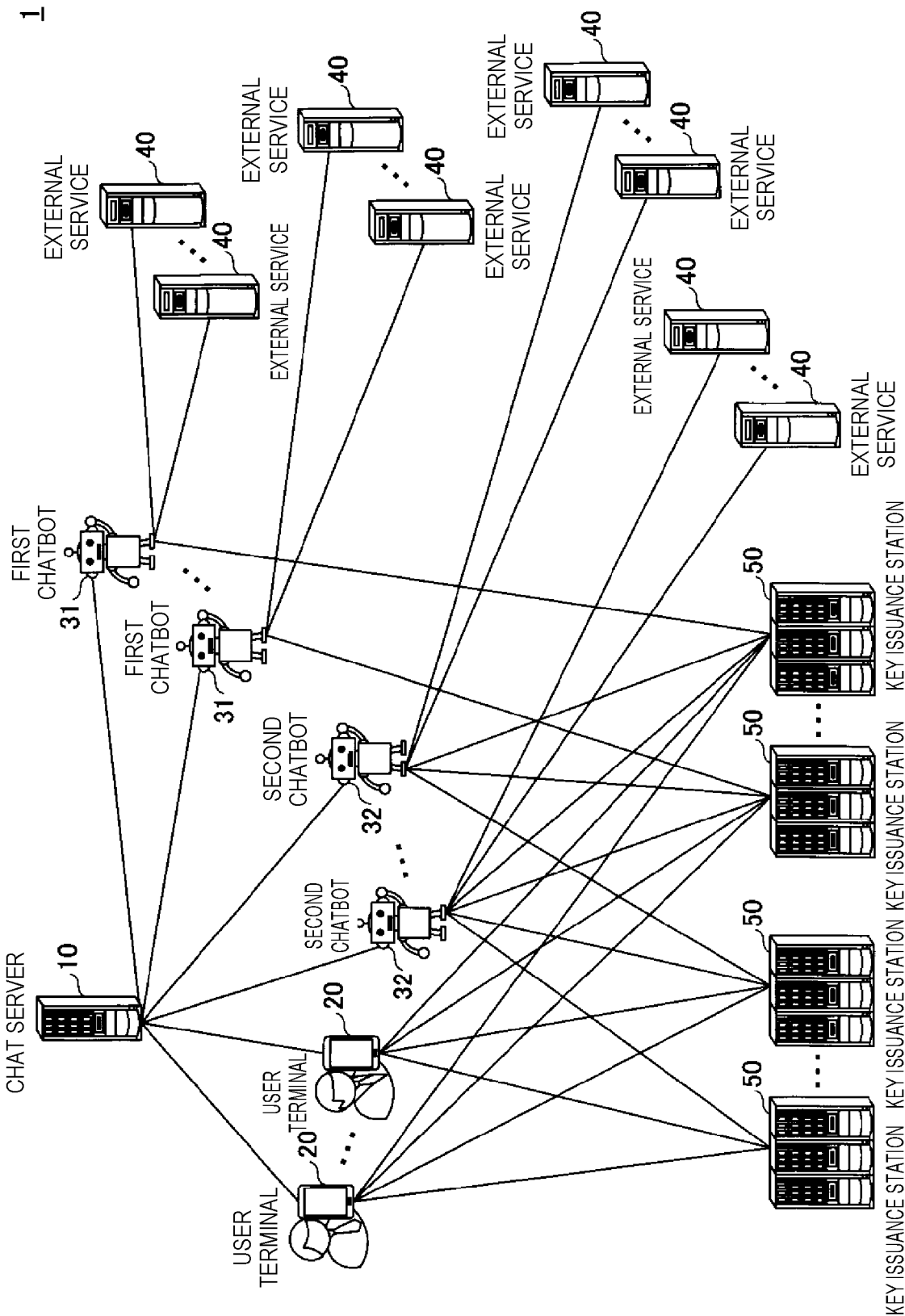
FIG. 2 is a diagram for explaining an example of an overall configuration of a chatbot system according to the present embodiment.

As shown in FIG. 2, a chat server 10, a plurality of user terminals 20, one or more first chatbots 31, one or more second chatbots 32, a plurality of external services 40, and one or more key issuance stations 50 are included in the chatbot system 1 according to the present embodiment. Note that both the first chatbot(s) 31 and the second chatbot(s) 32 need not be included and that, if either one of the first chatbot(s) 31 and the second chatbot(s) 32 is included, the other need not be included. Hereinafter, the first chatbot(s) 31 and the second chatbot(s) 32 will be collectively referred to as "chatbots 30."

In the chatbot system 1 according to the present embodiment, communication is performed between the chat server 10 and the user terminal 20, between the chat server 10 and the chatbot 30, between the chatbot 30 and the external service 40, between the user terminal 20 and the key issuance station 50, and between the chatbot 30 and the key issuance station 50. Note that the key issuance station 50 refers to a server or a system loaded with, e.g., a program which functions as a key issuance station. As described above, the chatbot 30 refers to, for example, a server or a system loaded with, e.g., a program which functions as a chatbot. Additionally, as described above, the external service 40 refers to a server or a system which provides the service.

Note that, in the following description of the present embodiment, the user terminal 20, for which a user ID of $UID_i$ is defined, will be referred to as a "user terminal $UID_i$" or simply "user $UID_i$" where i=1, ..., N. Similarly, unless otherwise specified, the chatbot 30, for which a chatbot ID of $CID_j$ is defined, will also be referred to as a "chatbot $CID_j$," where j=1, ..., L. Similarly, on the assumption that $P_i$ external services 40 are connected to the chatbot $CID_j$ (1≤i≤L), the external services 40 are denoted by "$S^i_1$," "$S^i_2$," "$S^i_{Pi}$," respectively. As for other reference characters, the same ones as those used in the above-described conventional chatbot system will be utilized.

<Functional Configuration of Chatbot System 1>

Functional configurations of the user terminal 20, the chatbot 30, and the key issuance station 50 included in the chatbot system 1 according to the present embodiment will be described.

<<Key Issuance Station 50<<

Figure 3:
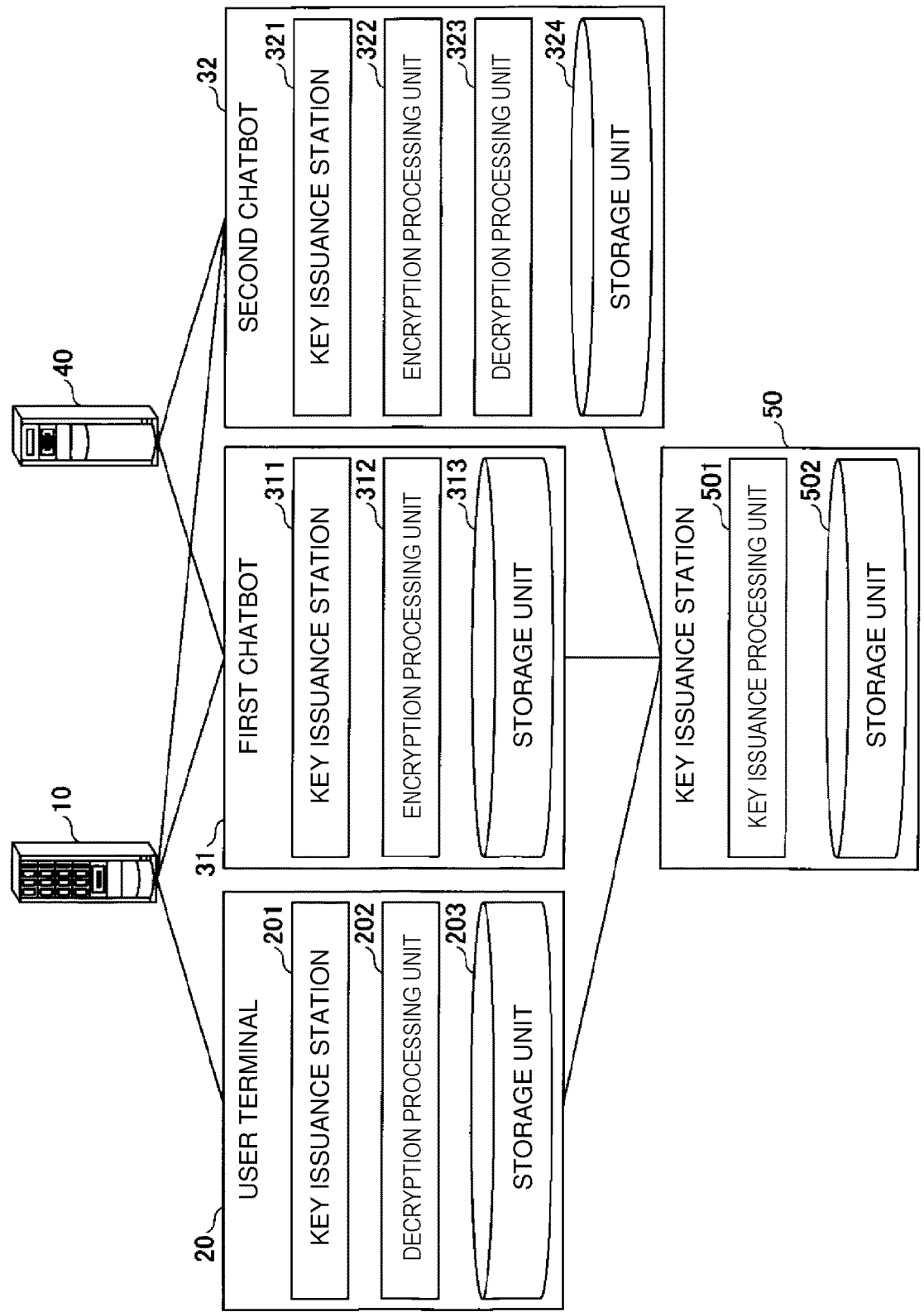
FIG. 3 is a diagram for explaining an example of a functional configuration of the chatbot system according to the present embodiment.

As shown in FIG. 3, the key issuance station 50 according to the present embodiment has a key issuance processing unit 501 and a storage unit 502. The key issuance processing unit 501 is implemented by a process which one or more programs installed on, e.g., a computer (information processing apparatus) cause a processor or the like to execute. The storage unit 502 can be implemented by using, for example, an auxiliary storage device.

The key issuance processing unit 501 performs a setup process and a secret key issuance process. The setup process generates a public key mpk and a master secret key msk by the setup algorithm Setup, transmits the public key mpk to the chatbot 30, and saves the master secret key msk in the storage unit 502.

When the secret key issuance process receives a user ID of UID and authentication information $TK_{UID}$ from the user terminal 20, the secret key issuance process performs authentication as to whether UID is a valid user ID, using $TK_{UID}$, and generates an attribute-equipped secret key having UID as an attribute by the key generation algorithm KeyGen and transmits the attribute-equipped secret key to the user terminal 20 if the authentication is successful. When the secret key issuance process receives a chatbot ID of CID and authentication information $TK_{CID}$ from the second chatbot 32, the secret key issuance process performs authentication as to whether CID is a valid chatbot ID, using $TK_{CID}$, and generates an attribute-equipped secret key having CID as an attribute by the key generation algorithm KeyGen and transmits the attribute-equipped secret key to the second chatbot 32 if the authentication is successful.

Note that, if the chat server 10 is a business chat server, an attribute-equipped secret key, to which a current time is added as an attribute in addition to a user ID or a chatbot ID, is generated at the time of attribute-equipped secret key generation in the secret key issuance process.

<<First Chatbot 31<<

As shown in FIG. 3, a chat processing unit 311, an encryption processing unit 312, and a storage unit 313 are included in the first chatbot 31 according to the present embodiment. The chat processing unit 311 and the encryption processing unit 312 are implemented by processes which one or more programs installed on, e.g., a computer (information processing apparatus) cause a processor or the like to execute. The storage unit 313 can be implemented by using, for example, an auxiliary storage device.

A key issuance station ID for unique identification of the key issuance station 50 and a public key which is acquired from the key issuance station 50 corresponding to the key issuance station ID are saved in the storage unit 313. Also, tables as described above (e.g., a table storing correspondence relationships between user IDs and client IDs and a table storing correspondence relationships between chatbot IDs and client IDs) are saved in the storage unit 313. Additionally, if the chat server 10 is a business chat server, a decryptable period length T (T is an integer not less than 1) is saved in the storage unit 313. Note that, as for the storage unit 313, public keys are not acquired from two or more key issuance stations 50.

The chat processing unit 311 performs a chatbot process. The encryption processing unit 312 encrypts a message using a public key stored in the storage unit 313 during the chatbot process. Thus, the first chatbot 31 refers to a chatbot with an encryption function.

The chatbot process for the first chatbot 31 is different from the chatbot process described with reference to the above-described conventional chatbot system, as described below.

The first chatbot 31 (assumed here to be a chatbot $CID_j$) performs the chatbot process on the basis of, for example, the condition that a message M and a user ID of $UID_j$ be received from the chat server 10, the condition that a message M and the chatbot ID of $CID_j$ be received from the chat server 10, or the condition that a condition for voluntary activation of the chatbot 30, such as the condition that a specified time come, be met. In a chatbot process, each of an external service data acquisition process and a message transmission process is executed 0 times, once, or more times in accordance with conditions and a procedure defined in the chatbot 30.

The external service 40 as a data acquisition destination (i.e., an external service as a data acquisition request transmission destination), a data acquisition request, and the like which are needed as inputs at the time of execution of the external service data acquisition process are set in advance in the chatbot 30 so as to correspond to timing of and conditions for execution of the chatbot process. For example, settings are made in the following manner: the transmission destination external service for the external service data acquisition process to be executed immediately after the start of processing is set to $S^i_k$, and the data acquisition request is set to a fixed value, Req; if a received message contains a particular phrase, the transmission destination external service for the external service data acquisition process is set to $S^i_k$, and the data acquisition request is set to be created on the basis of the message; the transmission destination external service for the external service data acquisition process to be executed after data acquisition from $S^i_k$ is set to $S^i_{k'}$, and the data acquisition request is set to be created on the basis of the data acquired from $S^i_k$; or the like. The message transmission process is executed after the external service data acquisition process is executed once or more times.

Inputs for and processing details of the external service data acquisition process and the message transmission process are illustrated in (1') and (2'), respectively, below.

(1') External Service Data Acquisition Process

[Inputs]

Transmission destination external service $S^i_k$

Data acquisition request Req

Client ID of $OID^i_{k,j}$

Table DL of data acquired from an external service, the table DL being a table having a column (data column)

where data acquired from the external service 40 is to be stored and a column (browse authority list column) where a browse authority list for the data is to be stored

[Processing Details]

Procedural Step 7-1: The chatbot CID, transmits the client ID of $OID^i_{k,j}$, proxy authentication information $Cert^i_{k,j}$ for the client ID of $OID^i_{k,j}$, and the data acquisition request Req to the external service $S^i_k$.

Procedural Step 7-2: When the external service $S^i_k$ receives $OID^i_{k,j}$, $Cert^i_{k,j}$, and Req, the external service $S^i_k$ confirms whether $Cert^i_{k,j}$ is proxy authentication information for $OID^i_{k,j}$ and also confirms whether $OID^i_{k,j}$ has browse authority for data D requested by Req. If affirmative results are obtained, the external service $S^i_k$ transmits the data D to the chatbot $CID_i$.

Procedural Step 7-3: The chatbot $CID_i$ receives D from the external service $S^i_k$.

Procedural Step 7-4: The chatbot $CID_i$ acquires a list I of client IDs having browse authority for D from the external service $S^i_k$.

Procedural Step 7-5: The chatbot CID, creates a list I' which is obtained by collecting all of user IDs and chatbot IDs corresponding to the client IDs included in the list ID, using correspondence relationships between client IDs and user IDs and correspondence relationships between client IDs and chatbot IDs in tables saved in the storage unit 313.

Procedural Step 7-6: The chatbot $CID_i$ associates D with I' and stores the result in the table DL (i.e., assigns the data column to D and the browse authority list column to I' and stores rows, in which D and I' are associated, in the table DL).

(2') Message Transmission Process

[Input]

Table DL of data acquired from an external service, the table DL being a table having a data column and a browse authority list column, as described above

[Processing Details]

Procedural Step 8-1: The chatbot $CID_i$ selects some pieces of data $D_1'$ to $D_q'$ from the data column of the table DL and converts these $D_1'$ to $D_q'$ into a message M' (or creates the message M' from these $D_1'$ to $D_q'$).

Procedural Step 8-2: The chatbot $CID_i$ takes out browse authority lists to $I_q'$ corresponding to $D_1'$ to $D_q'$, respectively, selected in procedural step 8-1 above from the table DL and creates a list I' which is a collection of user IDs and chatbot IDs common to the browse authority lists to $I_q'$.

Procedural Step 8-3: The chatbot $CID_i$ encrypts the message M' with a public key and generates a policy-equipped ciphertext. A policy utilized for the encryption at this time is that decryption is possible if "UID" or "CID" that is an attribute of an attribute-equipped secret key is included in the list I'.

Note that, if the chat server 10 is a business chat server, a policy utilized for encryption is that decryption is possible if the following conditions are met for "UID" or "CID" and a time s which are attributes of an attribute-equipped secret key. The conditions are that "UID" or "CID" as the attribute be included in the list I' and that $t \leq s \leq t+T$ hold where t is a current time at the time of encryption.

Procedural Step 8-4: The chatbot $CID_i$ transmits its chatbot ID of $CID_i$ and the policy-equipped ciphertext (i.e., the encrypted message M') to the chat server 10.

The chatbot process is as described in following procedural steps 9-1 to 9-4.

Procedural Step 9-1: The chatbot $CID_i$ starts the chatbot process.

Procedural Step 9-2: The chatbot $CID_i$ defines one user ID or chatbot ID to be utilized in the chatbot process. For example, if the chatbot process is started with reception of a message M and the user ID of $UID_j$ from the chat server 10 here, the chatbot $CID_i$ defines the received user ID of $UID_j$ as a user ID to be utilized in the chatbot process. If the chatbot process is started with reception of a message M and the chatbot ID of $CID_j$ from the chat server, the chatbot $CID_i$ defines the received chatbot ID of $CID_j$ as a chatbot ID to be utilized in the chatbot process.

Procedural Step 9-3: The chatbot $CID_i$ prepares an empty table DL for saving of data of the external service 40 and a browse authority list for the data to be acquired in the chatbot process and executes each of the external service data acquisition process and the message transmission process 0 times, once, or more times in accordance with conditions and a procedure defined in the chatbot 30.

Procedural Step 9-4: If the external service data acquisition process is to be executed, the chatbot $CID_i$ determines, as inputs, the transmission destination external service $S^i_k$ and a data acquisition request Req in accordance with settings defined in the chatbot 30. The chatbot $CID_i$ also uses, as an input, the client ID of $OID^i_{k,j}$ or a client ID of $OID^i_{k,N+j}$ corresponding to the user ID of $UID_j$ or the chatbot ID of $CID_j$ defined as a client ID in procedural step 9-1 above. Additionally, the chatbot $CID_i$ uses, as an input, the table DL prepared in procedural step 6-4 above. Note that data D acquired from the external service $S^i_k$ and a browse authority list for the data D are added to the table DL by the external service data acquisition process.

Procedural Step 9-5: If the message transmission process is to be executed, the chatbot $CID_i$ uses, as an input, the table DL for saving of data of the external service 40 and a browse authority list for the data. Note that the chatbot ID of $CID_i$ and an encrypted message M' are transmitted to the chat server by the message transmission process.

<<Second Chatbot 32>>

As shown in FIG. 3, a chat processing unit 321, an encryption processing unit 322, a decryption processing unit 323, and a storage unit 324 are included in the second chatbot 32 according to the present embodiment. The chat processing unit 321, the encryption processing unit 322, and the decryption processing unit 323 are implemented by processes which one or more programs installed on, e.g., a computer (information processing apparatus) cause a processor or the like to execute. The storage unit 324 can be implemented using, for example, an auxiliary storage device. Note that since the chat processing unit 321 and the encryption processing unit 322 are the same as the chat processing unit 311 and the encryption processing unit 312 of the first chatbot 31, a description thereof will be omitted.

An authentication token corresponding to each key issuance station ID is saved in the storage unit 324, in addition to the same information or data as in the first chatbot 31. A table storing an attribute-equipped secret key is also saved in the storage unit 324. The table has a key issuance station ID column and an attribute-equipped secret key column.

When the decryption processing unit 323 receives a message from the chat server 10, the decryption processing unit 323 determines whether decryption of the message is necessary and, if decryption is necessary, selects a key issuance station ID and decrypts the message using an attribute-equipped secret key corresponding to the selected key issuance station ID. Thus, the second chatbot 32 refers to a chatbot with an encryption and decryption function.

Examples of a method for determining whether decryption is necessary include making a determination on the basis of a chatbot ID of a transmission source of a message and making a determination as to whether a received message is a ciphertext, using an encryption scheme with a manipulation detection function. Examples of a method for selecting a key issuance station ID at the time of decryption include using a chatbot ID of a transmission source of a message and selecting all key issuance stations 50 serving as candidates.

When the second chatbot 32 makes a request to the key issuance station 50 for an attribute-equipped authentication key, the request contains a chatbot ID of the second chatbot 32 and an authentication token corresponding to the key issuance station 50.

If the decryptable period length or longer has elapsed at a time point of decryption of a message since a time of acquisition of an attribute-equipped secret key acquired from the key issuance station 50 in the past, the second chatbot 32 makes a request to the key issuance station 50 for issuance of a new attribute-equipped secret key. On the other hand, if the decryptable period length or longer has not elapsed, the second chatbot 32 uses the attribute-equipped secret key acquired in the past. If there is no attribute-equipped secret key acquired in the past, the second chatbot 32 selects a key issuance station ID of the key issuance station 50 as a transmission destination, to which a request is to be transmitted, by the above-described method. Note that an attribute-equipped secret key acquired from the key issuance station 50 is stored in the table saved in the storage unit 324.

<<User Terminal 20>>

As shown in FIG. 3, a chat processing unit 201, a decryption processing unit 202, and a storage unit 203 are included in the user terminal 20 according to the present embodiment. The chat processing unit 201 and the decryption processing unit 202 are implemented by processes which one or more programs installed on the user terminal 20 cause a processor or the like to execute. The storage unit 203 can be implemented using, for example, an auxiliary storage device.

A user ID of UID of the user terminal 20 and an authentication token $TK_{UID}$ corresponding to each key issuance station 50 are saved in the storage unit 203. A table storing an attribute-equipped secret key is also saved in the storage unit 203. The table has a key issuance station ID column and an attribute-equipped secret key column.

The chat processing unit 201 performs processing, such as creation and transmission of a message. When the decryption processing unit 202 receives a message from the chat server 10, the decryption processing unit 202 determines whether decryption of the message is necessary and, if decryption is necessary, selects a key issuance station ID and decrypts the message using an attribute-equipped secret key corresponding to the selected key issuance station ID. Thus, the user terminal 20 refers to a user terminal with a decryption function.

Examples of a method for determining whether decryption is necessary include making a determination on the basis of a chatbot ID of a transmission source of a message and making a determination as to whether a received message is a ciphertext, using an encryption scheme with a manipulation detection function. Examples of a method for selecting a key issuance station ID at the time of decryption include using a chatbot ID of a transmission source of a message and selecting all key issuance stations 50 serving as candidates.

When the user terminal 20 makes a request to the key issuance station 50 for an attribute-equipped authentication key, the request contains its user ID of UID and the authentication token $TK_{UID}$ corresponding to the key issuance station 50.

If the decryptable period length or longer has elapsed at a time point of decryption of a message since a time of acquisition of an attribute-equipped secret key acquired from the key issuance station 50 in the past, the user terminal 20 makes a request to the key issuance station 50 for issuance of a new attribute-equipped secret key. On the other hand, if the decryptable period length or longer has not elapsed, the user terminal 20 uses the attribute-equipped secret key acquired in the past. If there is no attribute-equipped secret key acquired in the past, the user terminal 20 selects a key issuance station ID of the key issuance station 50 as a transmission destination, to which a request is to be transmitted, by the above-described method. Note that an attribute-equipped secret key acquired from the key issuance station 50 is stored in the table saved in the storage unit 324.

In the above-described chatbot system 1 according to the present embodiment, a user ID or a chatbot ID is added as an attribute of an attribute-equipped secret key, and a policy set for a policy-equipped ciphertext makes it possible for only the user terminal 20 having browse authority for data of the external service 40 to browse the data. If the chat server 10 is a business chat server, a current time is added as an attribute of an attribute-equipped secret key. A policy set for a policy-equipped ciphertext makes it possible to browse only for a fixed period with browse authority at a time point of acquisition of the data by the chatbot 30 and prevent browsing after a lapse of a decryptable period, even if a message obtained by converting data of the external service 40 is saved in the chat server 10. For this reason, the chatbot system 1 according to the present embodiment can control utilization of data obtained from the external service 40.

<Hardware Configuration of Chatbot System 1>

Pieces of hardware of an apparatus or a system which implements the user terminal 20, the chatbot 30, and the key issuance station 50 included in the chatbot system 1 according to the present embodiment will be described. The user terminal 20, the chatbot 30, and the key issuance station 50 can be implemented by using, for example, pieces of hardware of a computer 600 shown in FIG. 4.

Figure 4:
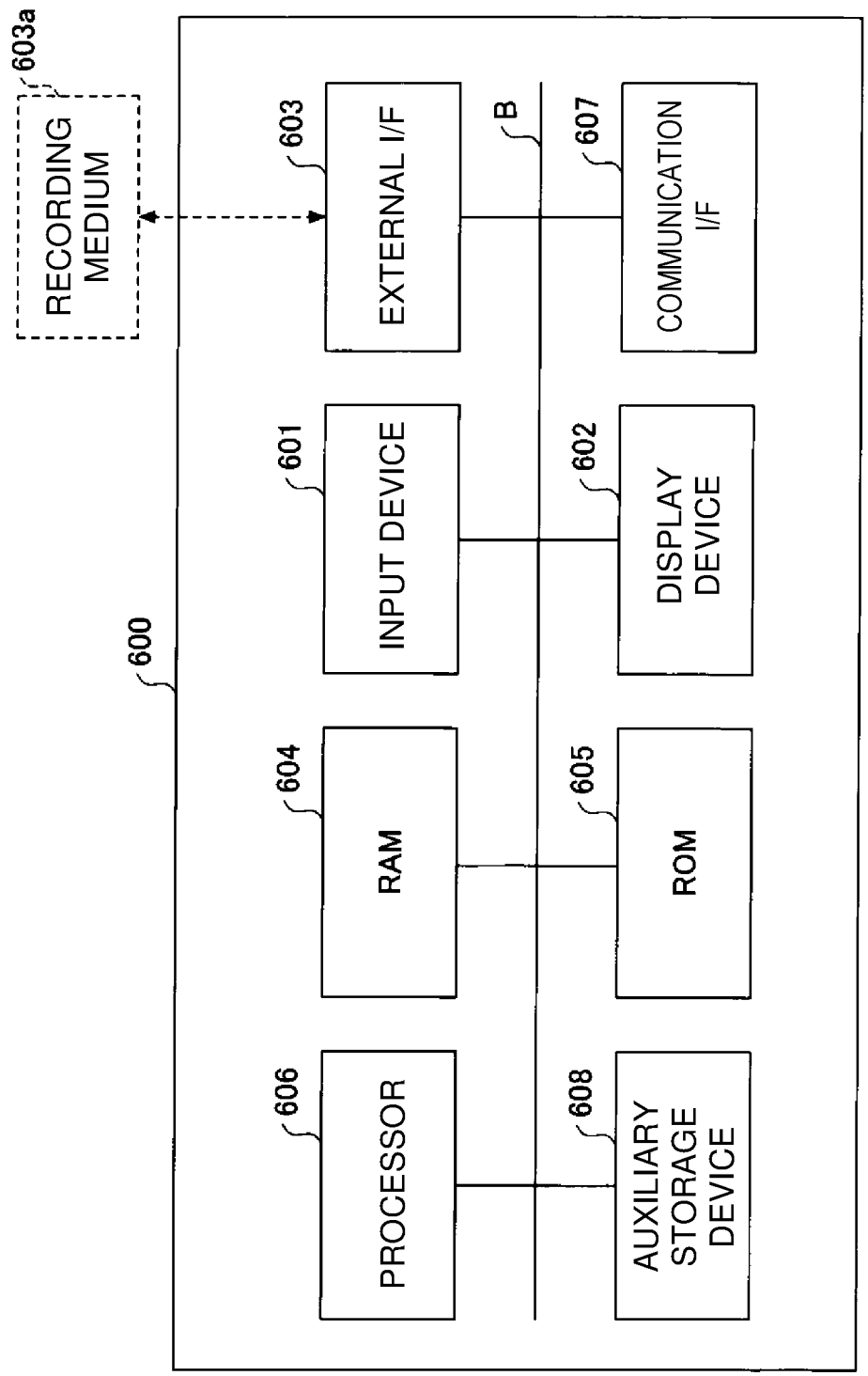
FIG. 4 is a diagram for explaining an example of a hardware configuration of a computer.

The computer 600 shown in FIG. 4 has an input device 601, a display device 602, an external I/F 603, a Random Access Memory (RAM) 604, a Read Only Memory (ROM) 605, a processor 606, a communication I/F 607, and an auxiliary storage device 608. The pieces of hardware are connected to one another via a bus B such that communication is possible.

The input device 601 is, for example, a keyboard, a mouse, or a touch panel. The display device 602 is, for example, a display. Note that at least either one of the input device 601 and the display device 602 need not be included in a computer which implements the chatbot 30 or the key issuance station 50.

The external I/F 603 is an interface with an external device. External devices include a recording medium 603*a*. The computer 600 can perform reading of or writing to the recording medium 603*a* or the like via the external I/F 603. Examples of the recording medium 603*a* include a Compact Disc (CD), a Digital Versatile Disk (DVD), an Secure Digital memory card (SD memory card), and a Universal Serial Bus (USB) memory card.

The RAM 604 is a volatile semiconductor memory which temporarily holds a program and data. The ROM 605 is a nonvolatile semiconductor memory which can hold a program and data even if the power is turned off.

The processor 606 is, for example, an arithmetic device, such as a Central Processing Unit (CPU), a Graphics Processing Unit (GPU), or a field-programmable gate array (FPGA).

The communication I/F 607 is an interface for connection of the computer 600 to a communication network. The auxiliary storage device 608 is, for example, a Hard Disk Drive (HDD) or a Solid State Drive (SSD).

The user terminal 20, the chatbot 30, and the key issuance station 50 according to the present embodiment can implement various types of processes (to be described later) by having the hardware configuration of the computer 600 shown in FIG. 4. Note that the chatbot 30 and the key issuance station 50 may be implemented by hardware configurations of a plurality of computers 600. A plurality of processors 606 and a plurality of memories (e.g., the RAM 604, the ROM 605, and the auxiliary storage device 608) may be included in the computer 600.

EXAMPLES

Examples 1 to 5 of the chatbot system 1 according to the present embodiment will be described hereinafter.

<<Setup Process and Secret Key Issuance Process>>

Figure 5:
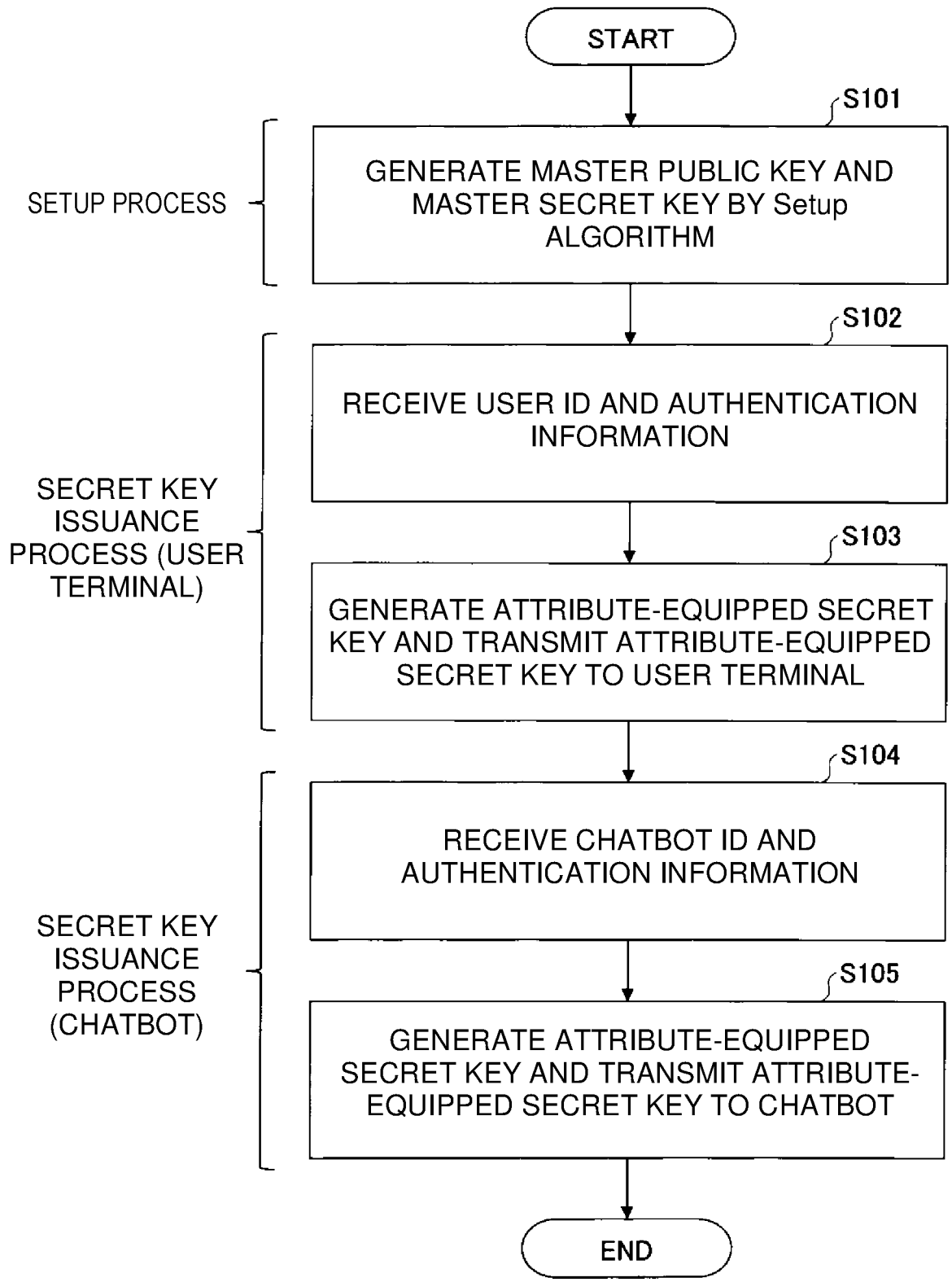
FIG. 5 is a chart for explaining the flow of a setup process and secret key issuance processes according to the present embodiment.

First, a setup process and key issuance processes will be described as processes common to the examples. FIG. 5 is a chart for explaining the flow of the setup process and the secret key issuance processes according to the present embodiment. Note that step S101 to be described hereinafter is the setup process and that steps S102 and S103 and steps S104 and S105 are a secret key issuance process (user terminal) and a secret key issuance process (chatbot), respectively. The setup process is generally executed once at the time of construction of the chatbot system 1. After that, the secret key issuance process (user terminal) and the secret key issuance process (chatbot) are then repeatedly executed each time the need for secret key issuance arises in the user terminal 20 or the second chatbot 32. That is, the secret key issuance process (user terminal) in steps S102 and S103 is repeatedly executed each time the need for secret key issuance arises in the user terminal 20. Similarly, the secret key issuance process (chatbot) in steps S104 and S105 is repeatedly executed each time the need for secret key issuance arises in the second chatbot 32.

Step S101: The key issuance processing unit 501 of the key issuance station 50 first generates a public key mpk and a master secret key msk by the setup algorithm Setup, and transmits the public key mpk to the chatbot 30 and saves the master secret key msk in the storage unit 502.

Step S102: The key issuance processing unit 501 of the key issuance station 50 receives a user ID of UID and authentication information $TK_{UID}$ from the user terminal 20.

Step S103: When the key issuance processing unit 501 of the key issuance station 50 receives the user ID of UID and the authentication information $TK_{UID}$, the key issuance processing unit 501 performs authentication as to whether UID is a valid user ID, using $TK_{UID}$. If the authentication is successful, the key issuance processing unit 501 generates an attribute-equipped secret key having UID as an attribute by the key generation algorithm KeyGen and transmits the attribute-equipped secret key to the user terminal 20.

Note that, if the chat server 10 is a business chat server (Example 2), as described above, an attribute-equipped secret key, to which a current time is added as an attribute in addition to a user ID, is generated at the time of attribute-equipped secret key generation.

Step S104: The key issuance processing unit 501 of the key issuance station 50 receives a chatbot ID of CID and authentication information $TK_{CID}$ from the second chatbot 32.

Step S105: When the key issuance processing unit 501 of the key issuance station 50 receives the chatbot ID of CID and the authentication information $TK_{CID}$, the key issuance processing unit 501 performs authentication as to whether CID is a valid chatbot ID, using $TK_{CID}$. If the authentication is successful, the key issuance processing unit 501 generates an attribute-equipped secret key having CID as an attribute by the key generation algorithm KeyGen and transmits the attribute-equipped secret key to the second chatbot 32.

Note that, if the chat server 10 is a business chat server (Example 2), as described above, an attribute-equipped secret key, to which a current time is added as an attribute in addition to a chatbot ID, is generated at the time of attribute-equipped secret key generation. Note that, if the second chatbot 32 is not included in the chatbot system 1, steps S104 and S105 above are not executed.

Example 1

A case where the chat server 10 is not a business chat server (i.e., is a usual chat server) will be described hereinafter as Example 1.

Preparation

Let IDSET be a set of user IDs and chatbot IDs. The present example assumes that an encryption scheme is composed of four algorithms (Setup, KeyGen, Enc, and Dec) and meets the following requirements. Note that k represents a security parameter here.

Setup Algorithm: $Setup(1^k) \rightarrow (mpk, msk)$

Key Generation Algorithm: for $ID \in IDSET$, $KeyGen(ID, mpk, msk) \rightarrow sk_{(ID)}$ Encryption Algorithm: for $I \subset IDSET$, $Enc(I, mpk, M) \rightarrow C_{(I)}$ where M represents a plain text Decryption Algorithm: $Dec(sk_{(ID)}, C_{(I)}) \rightarrow M'$ Assume that the encryption scheme meets the following correctness requirement.

$$Pr\left[M = M' \middle| \begin{array}{l} Setup(1^k) \rightarrow (mpk, msk), Enc(I, mpk, M) \rightarrow C_{(I)} \\ ID \in I, KeyGen(ID, mpk, msk) \rightarrow sk_{(ID)}, \\ Dec(sk_{(ID)}, C_{(I)}) \rightarrow M' \end{array}\right] = 1 \quad \text{[Math. 1]}$$

Examples of an encryption scheme which meets such a requirement include ciphertext policy attribute-based encryption.

In the present example, a table shown in Table 4 below is saved in the storage unit 203 of the user terminal 20. Table 4 shows a table stored in the storage unit 203 of a user $UID_1$.

TABLE 4

| Chatbot ID | Key issuance station ID | Authentication token | Secret key |
|---|---|---|---|
| $CID_1$ | $KGC_1$ | $TK^1_I$ | $SK^1_I$ |
| $CID_2$ | | | |
| $CID_3$ | $KGC_3$ | $TK^3_I$ | $SK^3_I$ |
| $CID_4$ | $KGC_4$ | $TK^4_I$ | |
| ... | ... | ... | ... |

The table has a chatbot ID column, a key issuance station ID column, an authentication token column, and a secret key column. A chatbot ID, a key issuance station ID, an authentication token, and an attribute-equipped secret key are stored in the respective columns. When the user terminal 20 receives a chatbot ID and a message from the chat server 10, the user terminal 20 can obtain an attribute-equipped secret key for decryption of the message by referring to the table. Hereinafter, a table as shown in Table 4 above will also be referred to as a "secret key table."

Note that, for a row where a key issuance station ID and an authentication token are stored but an attribute-equipped secret key is not stored, an attribute-equipped secret key has not yet been acquired. A row where neither a key issuance station ID nor an authentication token is stored is a row corresponding to a chatbot ID of a conventional chatbot (i.e., a chatbot without an encryption function).

Note that a table similar to the table shown in Table 4 above is assumed to be stored in the storage unit 324 of the second chatbot 32.

<<Case Where Chatbot Process Starts with Message Transmission by User Terminal 20>>

Figure 6:
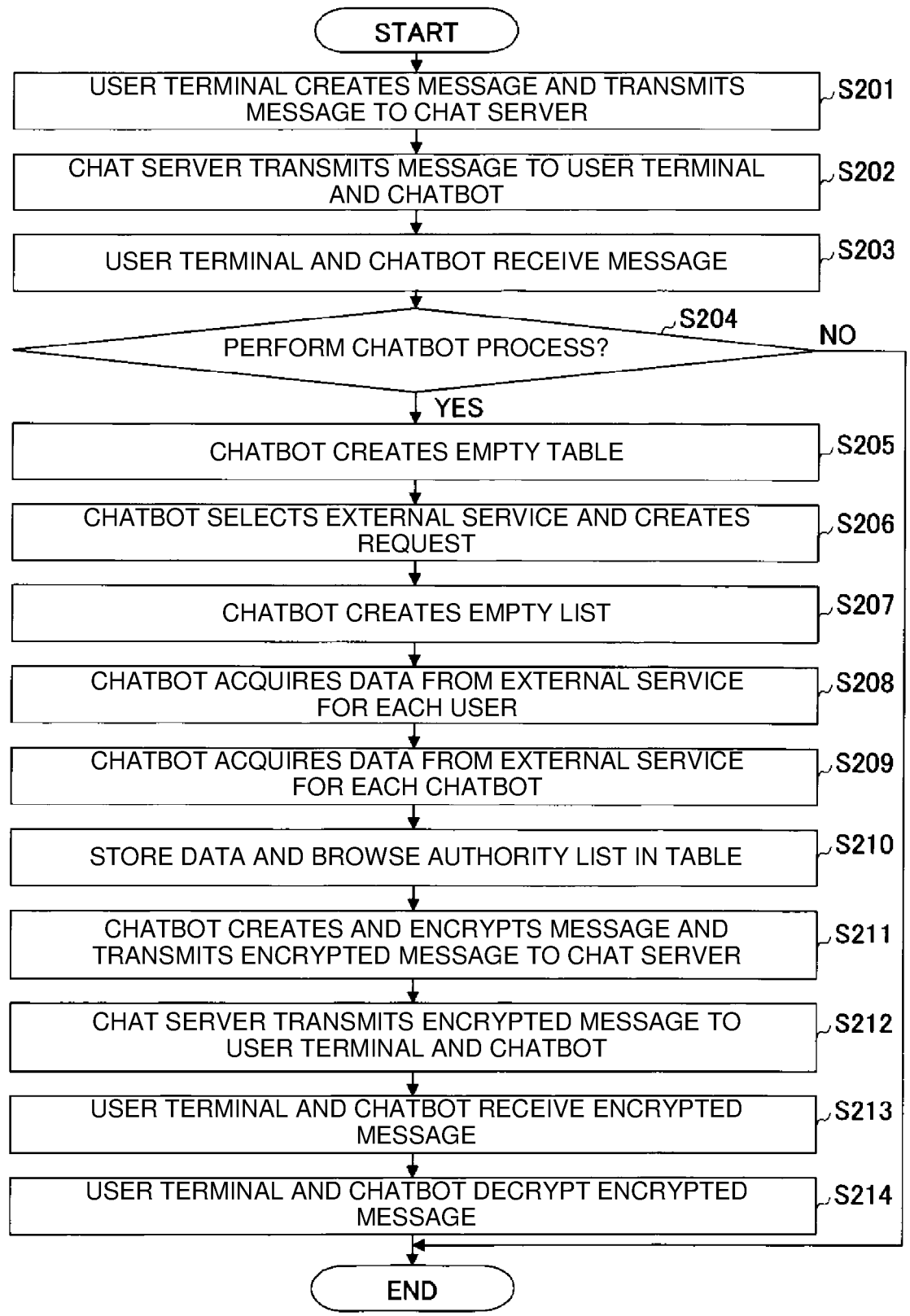
FIG. 6 is a chart for explaining the flow of a case (Example 1) where a chatbot utilization process starts with message transmission by a user terminal.

FIG. 6 is a chart for explaining the flow of a case (Example 1) where a chatbot utilization process starts with message transmission by the user terminal 20. In this case, a series of processes at the time of utilization of a chatbot by the user terminal 20 having a user ID of $UID_j$ is as follows.

Step S201: The chat processing unit 201 of the user UID creates a message M and transmits the message M and its user ID of $UID_j$ to the chat server 10.

Step S202: When the chat server 10 receives M and UID, the chat server 10 transmits M and UID to all of user terminals 20 (users $UID_1$ to $UID_N$) and chatbots 30 (chatbots $CID_1$ to $CID_L$) which are connected to the chat server 10.

Step S203: The chat processing unit 201 of each user $UID_i$ ($1 \le i \le N$) and the chat processing unit 311 (or the chat processing unit 321) of each chatbot $CID_i$ ($1 \le i \le L$) receive M and $UID_j$.

Hereinafter, operation of the chatbot 30 of the chatbot $CID_i$ ($1 \le i \le L$) will be described. As for operation of a conventional chatbot, the operation described with reference to the conventional chatbot system is performed. Thus, the chatbot $CID_i$ hereinafter refers to the chatbot 30 (i.e., a chatbot with an encryption function or a chatbot with an encryption and decryption function).

Step S204: The chat processing unit 311 (or the chat processing unit 321) of the chatbot $CID_i$ determines, on the basis of the message M received in step S203 above, whether to perform a chatbot process or stop without the chatbot process. The description will be continued hereinafter on the assumption that the chatbot process is to be performed.

For the sake of brevity, a description will be given hereinafter on the assumption that the first chatbot 31 is to perform the chatbot process. Thus, the chatbot $CID_i$ in subsequent steps S205 to S211 refers to the first chatbot 31. Note that, in a case where the second chatbot 32 performs the chatbot process, the chat processing unit 311 appearing hereinafter may be read as the chat processing unit 321 or the like.

Step S205: The chat processing unit 311 first creates an empty table DL for saving of data acquired from the external service 40. The table has a data column and a browse authority list column.

If data needs to be acquired from the external service 40 during the chatbot process, a process of acquiring data from an external service is executed. As an example, in subsequent steps S206 to S210, a q-th process of acquiring data from an external service will be described.

Step S206: The chat processing unit 311 of the chatbot $CID_i$ selects an external service $S^i_k$ ($1-k-P_j$), to which a data acquisition request is to be transmitted, on the basis of the message M received from the chat server 10 and the table DL and creates a data acquisition request $Req_q$.

Step S207: The chat processing unit 311 of the chatbot $CID_i$ creates an empty list $I_q$ for registration of user IDs and chatbot IDs which have browse authority for data acquired from the external service 40.

Step S208: The chat processing unit 311 of the chatbot $CID_i$ repeats following procedural steps 10-1 to 10-3 for each user ID of $UID_j$ ($1 \le j \le N$).

Procedural Step 10-1: The chat processing unit 311 of the chatbot $CID_i$ transmits a client ID of $OID^i_{k,j}$ corresponding to $UID_j$, proxy authentication information $Cert^i_{k,j}$ for $OID^i_{k,j}$, and $Req_q$ to the external service $S^i_k$. Note that, if there is no client ID corresponding to $UID_j$, the chat processing unit 311 executes procedural steps 10-1 to 10-3 for next $UID_{j+1}$.

Procedural Step 10-2: When the external service $S^i_k$ receives $Cert^i_{k,j}$ and $Req_q$, the external service $S^i_k$ confirms whether $Cert^i_{k,j}$ is proxy authentication information for $OID^i_{j,k}$ and also confirms whether $OID^i_{k,j}$ has browse authority for data $D_q$ requested by $Req_q$. If affirmative results are obtained, the external service $S^i_k$ transmits $D_q$ to the chatbot $CID_i$. If $Cert^i_{k,j}$ is not proxy authentication information for $OID^i_{k,j}$ or if $OID^i_{k,j}$ does not have browse authority for the data $D_q$, the external service $S^i_k$ transmits information indicating absence of browse authority to the chatbot $CID_i$.

Procedural Step 10-3: When the chat processing unit 311 of the chatbot $CID_i$ receives $D_q$ from the external service $S^i_k$, the chat processing unit 311 registers $UID_j$ in the list $I_q$.

Step S209: The chat processing unit 311 of the chatbot $CID_i$ repeats following procedural steps 11-1 to 11-3 for each chatbot ID of $CID_j$ ($1 \le j \le L$).

Procedural Step 11-1: The chat processing unit 311 of the chatbot CID, transmits a client ID of $OID^i_{k,N+j}$ corresponding to $CID_j$, proxy authentication information $Cert^i_{k,N+j}$ for $OID^i_{k,N+j}$, and $Req_q$ to the external service $S^i_k$. Note that, if there is no client ID corresponding to $CID_j$, the chat processing unit 311 executes procedural steps 11-1 to 11-3 for next $CID_{j+1}$.

Procedural Step 11-2: When the external service $S^i_k$ receives $OID^i_{k,N+j}$, $Cert^i_{k,N+j}$, and $Req_q$, the external service $S^i_k$ confirms whether $Cert^i_{k,N+j}$ is proxy authentication information for $OID^i_{k,N+j}$ and also confirms whether $OID^i_{k,N+j}$ has browse authority for the data $D_q$ requested by $Req_q$. If affirmative results are obtained, the external service $S^i_k$ transmits $D_q$ to the chatbot $CID_i$. If $Cert^i_{k,N+j}$ is not proxy authentication information for $OID^i_{k,N+j}$ or if $OID^i_{k,N+j}$ does not have browse authority for the data $D_q$, the external service $S^i_k$ transmits information indicating absence of browse authority to the chatbot $CID_i$.

Procedural Step 11-3: When the chat processing unit 311 of the chatbot $CID_i$ receives $D_q$ from the external service $S^i_k$, the chat processing unit 311 registers $CID_j$ in the list $I_q$.

Step S210: The chat processing unit 311 of the chatbot $CID_i$ associates the data $D_q$ with the list $I_q$ and stores the result in the table DL.

Step S211: The chatbot $CID_i$ creates and encrypts a message and transmits the encrypted message to the chat server 10 through following procedural steps 12-1 to 12-5.

Procedural Step 12-1: The chat processing unit 311 of the chatbot CID, selects pieces of data $D_1$ to $D_q$ from the data column of the table DL on the basis of the message M and the table DL.

Procedural Step 12-2: The chat processing unit 311 of the chatbot CID, creates a message M' from $D_1$ to $D_{q'}$ selected in procedural step 12-1 above.

Procedural Step 12-3: The chat processing unit 311 of the chatbot $CID_i$ takes out lists to corresponding to $D_1$ to $D_{q'}$, respectively, and creates a list I which is a collection of user IDs and chatbot IDs common to and registered in $I_1'$ to $I_{q'}$.

Procedural Step 12-4: The encryption processing unit 312 of the chatbot $CID_i$ obtains a message $C_{(I)}$ which is encrypted by Enc(I,mpk,M')→$C_{(I)}$.

Procedural Step 12-5: The chat processing unit 311 of the chatbot $CID_i$ transmits its chatbot ID of $CID_i$ and the message $C_{(I)}$ to the chat server 10.

Step S212: When the chat server 10 receives $CID_i$ and $C_{(I)}$, the chat server 10 transmits $CID_i$ and $C_{(I)}$ to the users $UID_1$ to $UID_N$ and the chatbots $CID_1$ to $CID_L$.

Step S213: The users $UID_1$ to $UID_N$ and the chatbots $CID_1$ to $CID_L$ each receive $CID_i$ and $C_{(I)}$.

Step S214: The users $UID_1$ to $UID_N$ and the chatbots $CID_1$ to $CID_L$ decrypt the message $C_{(I)}$. Hereinafter, a case where the user $UID_j$ decrypts $C_{(I)}$ will be described in procedural steps 13-1 to 13-5, and a case where the chatbot $CID_j$ that is the second chatbot 32 (i.e., a chatbot with an encryption and decryption function) of the chatbots $CID_1$ to $CID_L$ decrypts $C_{(I)}$ will be described in procedural steps 14-1 to 14-5.

Case Where User UID Decrypts $C_{(I)}$

Procedural Step 13-1: When the decryption processing unit 202 of the user UID confirms that the received CID is a chatbot ID, the decryption processing unit 202 acquires an attribute-equipped secret key $sk_j$ corresponding to the chatbot ID, using the secret key table stored in the storage unit 203.

Procedural Step 13-2: If an attribute-equipped secret key corresponding to the chatbot ID is not stored in the secret key table, the decryption processing unit 202 of the user $UID_j$ selects a key issuance station ID corresponding to the chatbot ID in the secret key table. The decryption processing unit 202 of the user $UID_j$ transmits an authentication token $TK^1_j$ corresponding to the chatbot ID in the secret key table and $UID_j$ to the key issuance station 50 with the selected key issuance station ID. Note that the authentication token $TK^1_j$ refers to, for example, an authentication token corresponding to a key issuance station ID of $KGC_1$ which is held by the user $UID_j$.

Procedural Step 13-3: When the key issuance processing unit 501 of the key issuance station 50 receives $UID_j$ and $TK^1_j$, the key issuance processing unit 501 verifies whether $UID_j$ is valid, using the authentication token $TK^1_j$. If it is verified that $UID_j$ is valid, the key issuance processing unit 501 substitutes $UID_j$ for UID and obtains an attribute-equipped secret key $sk_{(UID)}$ by KeyGen (UID,mpk,msk)→$sk_{(UID)}$.

Procedural Step 13-4: The key issuance processing unit 501 of the key issuance station 50 transmits the attribute-equipped secret key $sk_{(UID)}$ to the user $UID_j$.

Procedural Step 13-5: The decryption processing unit 202 of the user $UID_j$ substitutes the attribute-equipped secret key $sk_j$ acquired by procedural step 13-1 above for $sk_{(UID)}$ or uses the attribute-equipped secret key $sk_{(UID)}$ transmitted in procedural step 13-4 above to decrypt $C_{(I)}$ by Dec($sk_{(uid)}$,$C_{(I)}$)→M', and obtains the message M'.

Case Where Chatbot $CID_j$ Decrypts $C_{(I)}$

Procedural Step 14-1: When the decryption processing unit 323 of the chatbot $CID_j$ confirms that the received CID is a chatbot ID, the decryption processing unit 323 acquires an attribute-equipped secret key $sk_j$ corresponding to the chatbot ID, using the secret key table stored in the storage unit 324.

Procedural Step 14-2: If an attribute-equipped secret key corresponding to the chatbot ID is not stored in the secret key table, the decryption processing unit 323 of the chatbot $CID_j$ selects a key issuance station ID corresponding to the chatbot ID in the secret key table. The decryption processing unit 323 of the chatbot $CID_j$ transmits authentication token $TK^1_j$ corresponding to the chatbot ID in the secret key table and $CID_j$ to the key issuance station 50 with the selected key issuance station ID. Note that the authentication token $TK^1_j$ refers to, for example, an authentication token corresponding to a key issuance station ID of $KGC_1$ which is held by $CID_j$.

Procedural Step 14-3: When the key issuance processing unit 501 of the key issuance station 50 receives $CID_j$ and $TK^1_j$, the key issuance processing unit 501 verifies whether $CID_j$ is valid, using the authentication token $TK^1_j$. If it is verified that $CID_j$ is valid, the key issuance processing unit 501 substitutes $CID_j$ for CID and obtains an attribute-equipped secret key $sk_{(CID)}$ by KeyGen (CID, mpk, msk)→$sk_{(CID)}$.

Procedural Step 14-4: The key issuance processing unit 501 of the key issuance station 50 transmits the attribute-equipped secret key $sk_{(CID)}$ to the chatbot $CID_j$.

Procedural Step 14-5: The decryption processing unit 323 of the chatbot $CID_j$ substitutes the attribute-equipped secret key $sk_j$ acquired by procedural step 14-1 above for $sk_{(CID)}$ or uses the attribute-equipped secret key $sk_{(CID)}$ transmitted in procedural step 14-4 above to decrypt $C_{(I)}$ by Dec($sk_{(Cid)}$, $C_{(I)}$)→M', and obtains the message M'.

<<Case Where Chatbot Utilization Starts with Reception of Data from External Service 40 by Chatbot 30>>

Figure 7:
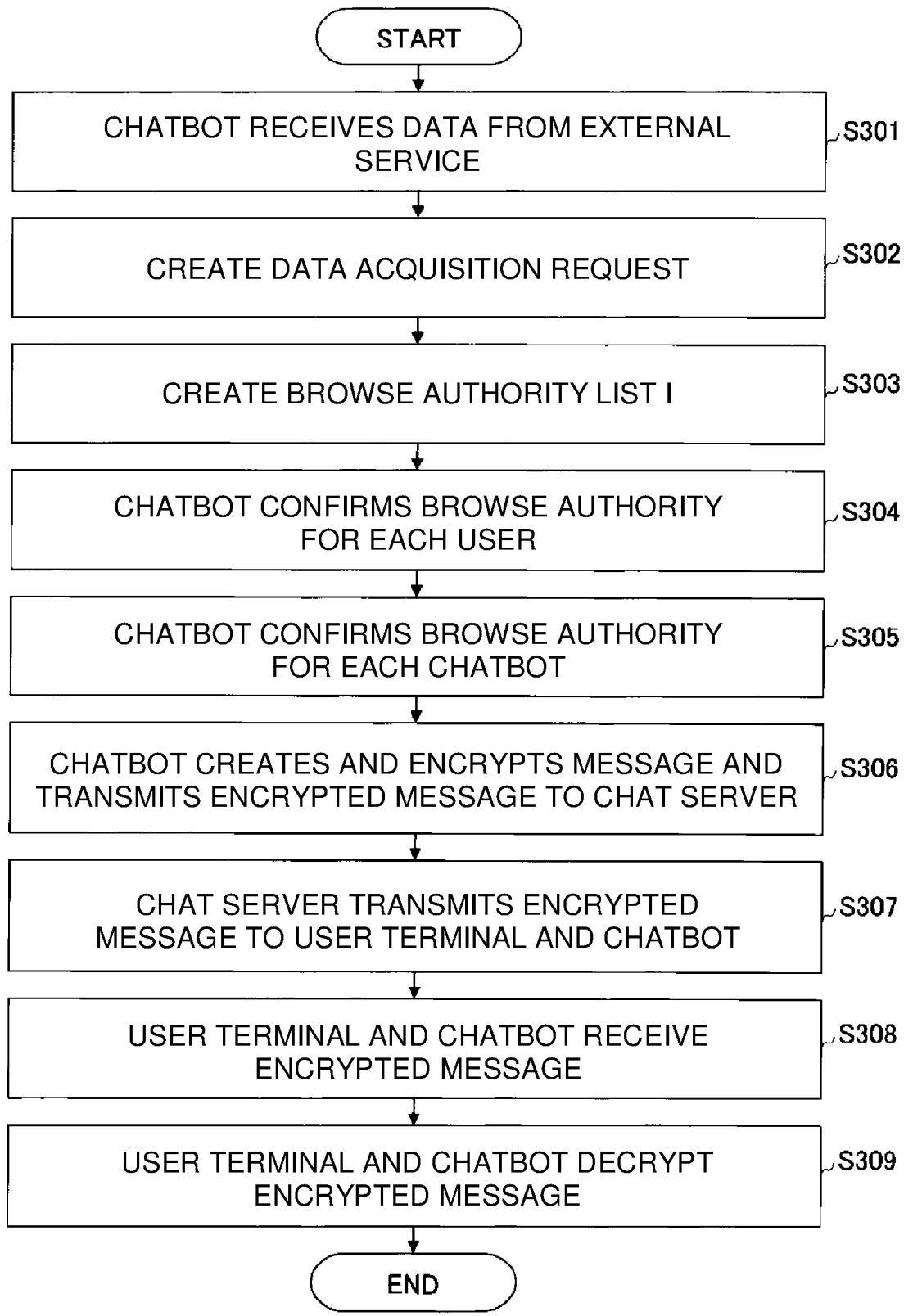
FIG. 7 is a chart for explaining the flow of a case (Example 1) where a chatbot utilization process starts with data reception from an external service by a chatbot.

FIG. 7 is a chart for explaining the flow of a case (Example 1) where a chatbot utilization process starts with reception of data from the external service 40 by the chatbot 30. In this case, a series of processes at the time of utilization of a chatbot by the user terminal 20 having the user ID of $UID_j$ is as follows. For the sake of brevity, a description will be given hereinafter on the assumption that the chatbot $CID_i$ is the first chatbot 31. If the chatbot $CID_i$ is the second chatbot 32, the chat processing unit 311 may be read as the chat processing unit 321 or the like.

Step S301: When the chat processing unit 311 of the chatbot $CID_i$ receives data D from the external service $S^i_k$, the chat processing unit 311 starts a chatbot process.

Step S302: The chat processing unit 311 of the chatbot $CID_1$ creates a data acquisition request Req for acquisition of the data D.

Step S303: The chat processing unit 311 of the chatbot $CID_1$ creates an empty list I (browse authority list) for registration of user IDs and chatbot IDs which have browse authority for the data D.

Step S304: The chat processing unit 311 of the chatbot $CID_i$ repeats following procedural steps 15-1 to 15-3 for each user ID of $UID_j$ ($1 \le j \le N$).

Procedural Step 15-1: The chat processing unit 311 of the chatbot CID, transmits the client ID of $OID^i_{k,j}$ corresponding to $UID_j$, the proxy authentication information $Cert^i_{k,j}$ for $OID^i_{k,j}$ and Req to the external service $S^i_k$. Note that, if there is no client ID corresponding to $UID_j$, the chat processing unit 311 executes procedural steps 15-1 to 15-3 for next $UID_{j+1}$.

Procedural Step 15-2: When the external service $S^i_k$ receives $Cert^i_{k,j}$, and $Req_q$, the external service $S^i_k$ confirms whether $Cert^i_{k,j}$ is proxy authentication information for $OID^i_{k,j}$ and also confirms whether $OID^i_{j,k}$ has browse authority for the data D requested by Req. If affirmative results are obtained, the external service $S^i_k$ transmits D to the chatbot $CID_i$. If $Cert^i_{k,j}$ is not proxy authentication information for $OID^i_{k,j}$ or if $OID^i_{k,j}$ does not have browse authority for the data D, the external service $S^i_k$ transmits information indicating absence of browse authority to the chatbot $CID_i$.

Procedural Step 15-3: When the chat processing unit 311 of the chatbot $CID_i$ receives D from the external service $S^i_k$, the chat processing unit 311 registers $UID_j$ in the list I.

Step S305: The chat processing unit 311 of the chatbot $CID_i$ repeats following procedural steps 16-1 to 16-3 for each chatbot ID of $CID_j$ ($1 \le j \le L$).

Procedural Step 16-1: The chat processing unit 311 of the chatbot $CID_i$ transmits the client ID of $OID^i_{k,N+j}$ corresponding to $CID_j$, the proxy authentication information $Cert^i_{k,N+j}$ for $OID^i_{k,N+j}$, and Req to the external service $S^i_k$. Note that, if there is no client ID corresponding to $CID_j$, the chat processing unit 311 executes procedural steps 16-1 to 16-3 for next $CID_{j+1}$.

Procedural Step 16-2: When the external service $S^i_k$ receives $OID^i_{k,N+j}$, $Cert^i_{k,N+j}$, and Req, the external service $S^i_k$ confirms whether $Cert^i_{k,N+j}$ is proxy authentication information for $OID^i_{k,N+j}$ and also confirms whether $OID^i_{k,N+j}$ has browse authority for the data D requested by Req. If affirmative results are obtained, the external service $S^i_k$ transmits D to the chatbot $CID_i$. If $Cert^i_{k,N+j}$ is not proxy authentication information for $OID^i_{k,N+j}$ or if $OID^i_{k,N+j}$ does not have browse authority for the data D, the external service $S^i_k$ transmits information indicating absence of browse authority to the chatbot $CID_i$.

Procedural Step 16-3: When the chat processing unit 311 of the chatbot $CID_i$ receives D from the external service $S^i_k$, the chat processing unit 311 registers $CID_j$ in the list I.

Step S306: The chat processing unit 311 of the chatbot $CID_i$ creates and encrypts a message and transmits the encrypted message to the chat server 10 through following procedural steps 17-1 to 17-3.

Procedural Step 17-1: The chat processing unit 311 of the chatbot $CID_i$ creates a message M' from the data D.

Procedural Step 17-2: The encryption processing unit 312 of the chatbot $CID_i$ obtains a message $C_{(I)}$ which is encrypted by $Enc(I,mpk,M') \to C_{(I)}$.

Procedural Step 17-3: The chat processing unit 311 of the chatbot $CID_i$ transmits its chatbot ID of $CID_i$ and the message $C_{(I)}$ to the chat server 10.

Step S307: When the chat server 10 receives $CID_i$ and $C_{(I)}$, the chat server 10 transmits $CID_i$ and $C_{(I)}$ to the users $UID_1$ to $UID_N$ and the chatbots $CID_1$ to $CID_L$.

Step S308: The users $UID_1$ to $UID_N$ and the chatbots $CID_1$ to $CID_L$ each receive $CID_i$ and $C_{(I)}$.

Step S309: The users $UID_1$ to $UID_N$ and the chatbots $CID_1$ to $CID_L$ decrypt the message $C_{(I)}$. The decryption processing by the users $UID_1$ to $UID_N$ and the chatbots $CID_1$ to $CID_L$ is the same as procedural steps 13-1 to 13-5 and procedural steps 14-1 to 14-5 of S214 above.

Example 2

A case where the chat server 10 is a business chat server (i.e., the chat server 10 saves a message) will be described hereinafter as Example 2.

Preparation

Let IDSET be a set of user IDs and chatbot IDs, and ID be a partial set of IDSET. Let $[0,N_1]=\{0,1,2,\ldots,N_1\}$ where $N_1$ is a positive integer. The present example assumes that an encryption scheme is composed of four algorithms (Setup, KeyGen, Enc, and Dec) and meets the following requirements. Note that k represents a security parameter.

Setup Algorithm: $Setup(1^k) \to (mpk, msk)$

Key Generation Algorithm: for $id \in IDSET$ and t, $KeyGen(id,t,mpk,msk) \to sk_{(id,t)}$ Encryption Algorithm: for $S \subset ID$ and $[t_1,t_2] \subset [0,N_1]$, $$Enc(S, [t_1,t_2], mpk, M) \to C_{(S,[t_1,t_2])} \quad \text{[Math. 2]}$$

where M represents a plain text

Decryption Algorithm:

$$Dec(sk_{(id,t)}, C_{(S,[t_1,t_2])}) \to M' \quad \text{[Math. 3]}$$

Assume that the above-described encryption scheme meets the following correctness requirement.

$$Pr\left[M = M' \left| \begin{array}{l} Setup(1^k) \to (mpk, msk), Enc(S, t, t+T, mpk, M) \to C_{(S,[t_1,t_2])} \\ id \in S, t <= s < t+T, KeyGen(id, s, mpk, msk) \to sk_{(id,s)}, \\ Dec(sk_{(id,s)} C_{(S,t,t+T)}) \to M' \end{array} \right. \right] = 1 \quad \text{[Math. 4]}$$

Examples of an encryption scheme which meets such a requirement include ciphertext policy attribute-based encryption.

The present example also assumes that secret key tables as shown in Table 4 above are saved in the storage unit 203 of the user terminal 20 and the storage unit 324 of the second chatbot 32.

<<Case Where Chatbot Process Starts with Message Transmission by User Terminal 20>>

Figure 8:
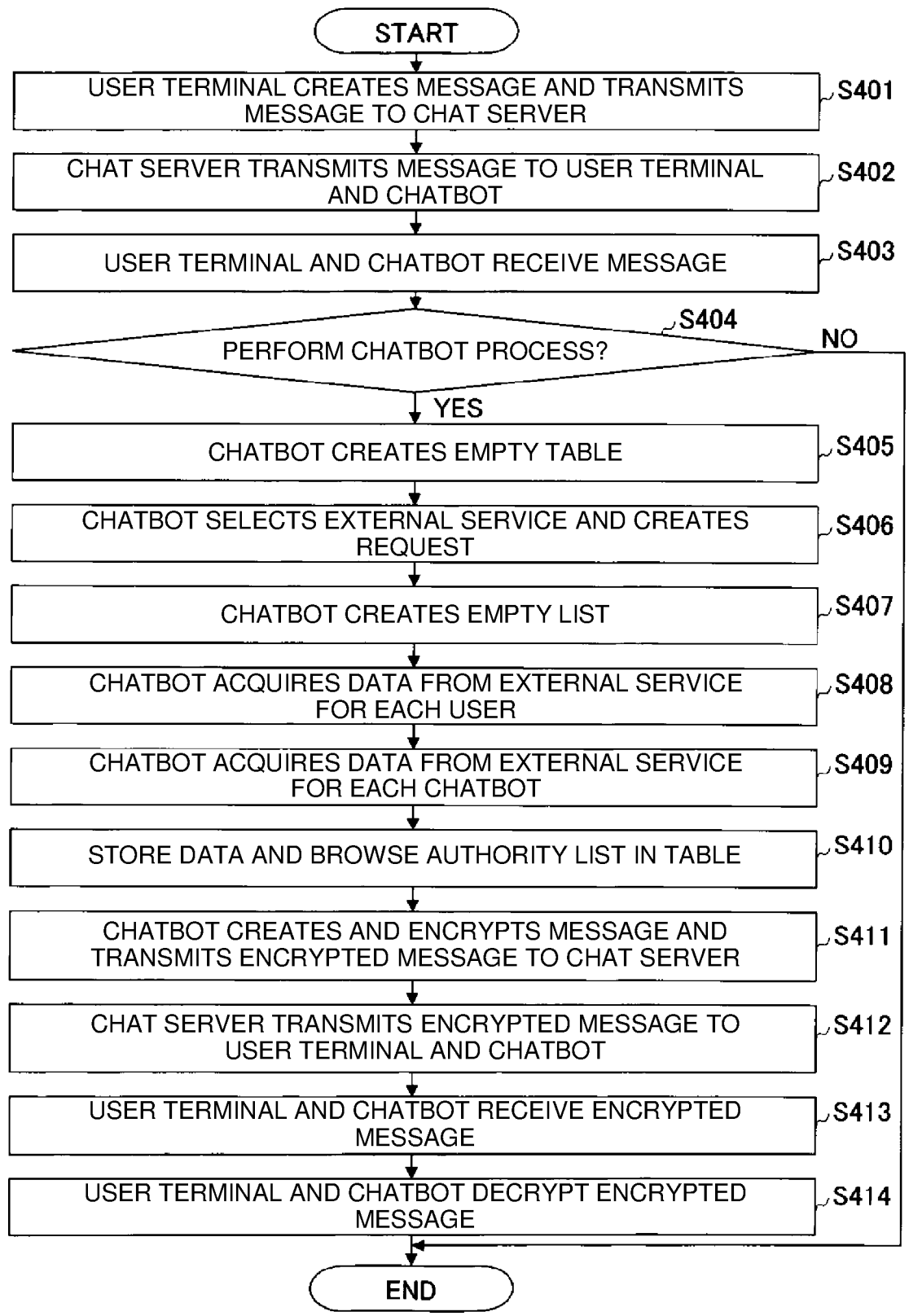
FIG. 8 is a chart for explaining the flow of a case (Example 2) where a chatbot utilization process starts with message transmission by a user terminal.

FIG. 8 is a chart for explaining the flow of a case (Example 2) where a chatbot utilization process starts with message transmission by the user terminal 20. In this case, a series of processes at the time of utilization of a chatbot by the user terminal 20 having a user ID of UID is as follows.

Since steps S401 to S410 are the same as steps S201 to S210 in FIG. 6, a description thereof will be omitted.

Step S411: The chatbot $CID_i$ creates and encrypts a message and transmits the encrypted message to the chat server 10 through following procedural steps 17-1 to 17-5.

Procedural Step 17-1: The chat processing unit 311 of the chatbot $CID_i$ selects pieces of data $D_1$ to $D_{q'}$ from a data column of a table DL on the basis of a message M and the table DL.

Procedural Step 17-2: The chat processing unit 311 of the chatbot $CID_i$ creates a message M' from $D_1$ to $D_{q'}$ selected in procedural step 12-1 above.

Procedural Step 17-3: The chat processing unit 311 of the chatbot $CID_i$ takes out lists $I_1'$ to $I_{q'}$ corresponding to $D_1$ to $D_{q'}$, respectively, and creates a list I which is a collection of user IDs and chatbot IDs common to and registered in $I_1'$ to $I_{q''}$.

Procedural Step 17-4: The encryption processing unit 312 of the chatbot $CID_i$ substitutes $I_q$ for I and obtains a message (the encrypted message is denoted by $C_q$) which is encrypted by:

$$\mathrm{Enc}(I_q, [t, t+T], \mathrm{mpk}, M) \to C_{(I_q, [t,t+T])} \quad [\text{Math. 5}]$$

where T represents a decryptable period length.

Procedural Step 17-5: The chat processing unit 311 of the chatbot $CID_i$ transmits its chatbot ID of $CID_i$ and the message $C_q$ to the chat server 10.

Step S412: When the chat server 10 receives $CID_i$ and $C_q$, the chat server 10 transmits $CID_i$ and $C_q$ to the users $UID_1$ to $UID_N$ and the chatbots $CID_1$ to $CID_L$.

Step S413: The users $UID_1$ to $UID_N$ and the chatbots $CID_1$ to $CID_L$ each receive $CID_i$ and $C_q$.

Step S414: The users $UID_1$ to $UID_N$ and the chatbots $CID_1$ to $CID_L$ decrypt the message $C_q$. Hereinafter, a case where the user $UID_j$ decrypts $C_q$ will be described in procedural steps 18-1 to 18-5, and a case where the chatbot $CID_j$ that is the second chatbot 32 (i.e., a chatbot with an encryption and decryption function) of the chatbots $CID_1$ to $CID_L$ decrypts $C_q$ will be described in procedural steps 19-1 to 19-5.

Case Where User $UID_j$ Decrypts $C_q$

Procedural Step 18-1: When the decryption processing unit 202 of the user UID confirms that the received CID is a chatbot ID, the decryption processing unit 202 acquires an attribute-equipped secret key $sk_j$ corresponding to the chatbot ID, using the secret key table stored in the storage unit 203.

Procedural Step 18-2: If an attribute-equipped secret key corresponding to the chatbot ID is not stored in the secret key table, the decryption processing unit 202 of the user $UID_j$ selects a key issuance station ID corresponding to the chatbot ID in the secret key table. The decryption processing unit 202 of the user $UID_j$ transmits an authentication token $TK^1_j$ corresponding to the chatbot ID in the secret key table and $UID_j$ to the key issuance station 50 with the selected key issuance station ID.

Procedural Step 18-3: When the key issuance processing unit 501 of the key issuance station 50 receives $UID_j$ and $TK^1_j$, the key issuance processing unit 501 verifies whether $UID_j$ is valid, using the authentication token $TK^1_j$. If it is verified that $UID_j$ is valid, the key issuance processing unit 501 substitutes $UID_j$ for UID and obtains an attribute-equipped secret key $sk_{(UID,s)}$ by:

$$\mathrm{KeyGen}(UID, s, \mathrm{mpk}, \mathrm{msk}) \to sk_{(UID,s)} \quad [\text{Math. 6}]$$

where s represents a current time.

Procedural Step 18-4: The key issuance processing unit 501 of the key issuance station 50 transmits the attribute-equipped secret key $sk_{(UID,s)}$ to the user $UID_j$.

Procedural Step 18-5: The decryption processing unit 202 of the user $UID_j$ substitutes the attribute-equipped secret key $sk_j$ acquired by procedural step 18-1 above for $sk_{(UID,s)}$ or uses the attribute-equipped secret key $sk_{(UID,s)}$ transmitted in procedural step 18-4 above to decrypt $C_q$ by:

$$\mathrm{Dec}(sk_{(UID,s)}, C_{(I_q,[t,t+T])}) \to M' \quad [\text{Math. 7}]$$

and obtains the message M'.

Case Where Chatbot $CID_j$ Decrypts $C_q$

Procedural Step 19-1: When the decryption processing unit 323 of the chatbot $CID_j$ confirms that the received CID is a chatbot ID, the decryption processing unit 323 acquires an attribute-equipped secret key $sk_j$ corresponding to the chatbot ID, using the secret key table stored in the storage unit 324.

Procedural Step 19-2: If an attribute-equipped secret key corresponding to the chatbot ID is not stored in the secret key table, the decryption processing unit 323 of the chatbot $CID_j$ selects a key issuance station ID corresponding to the chatbot ID in the secret key table. The decryption processing unit 323 of the chatbot $CID_j$ transmits an authentication token $TK^1_j$ corresponding to the chatbot ID in the secret key table and $CID_j$ to the key issuance station 50 with the selected key issuance station ID.

Procedural Step 19-3: When the key issuance processing unit 501 of the key issuance station 50 receives $CID_j$ and $TK^1_j$, the key issuance processing unit 501 verifies whether $CID_j$ is valid, using the authentication token $TK^1_j$. If it is verified that $CID_j$ is valid, the key issuance processing unit 501 substitutes $CID_j$ for CID and obtains an attribute-equipped secret key $sk_{(CID,s)}$ by:

$$\mathrm{KeyGen}(CID, s, \mathrm{mpk}\ \mathrm{msk}) \to sk_{(CID,s)} \quad [\text{Math. 8}]$$

where s represents a current time.

Procedural Step 19-4: The key issuance processing unit 501 of the key issuance station 50 transmits the attribute-equipped secret key $sk_{(CID,s)}$ to the chatbot $CID_j$.

Procedural Step 19-5: The decryption processing unit 323 of the chatbot $CID_j$ substitutes the attribute-equipped secret key $sk_j$ acquired by procedural step 19-1 above for $sk_{(CID,s)}$ or uses the attribute-equipped secret key $sk_{(CID,s)}$ transmitted in procedural step 19-4 above to decrypt $C_q$ by:

$$\mathrm{Dec}(sk_{(CID,s)}, C_{(I_q,[t,t+T])}) \to M' \quad [\text{Math. 9}]$$

and obtains the message M'.

Example 3

A case where there is only one key issuance station 50 will be described hereinafter as Example 3. If there is only one key issuance station 50, only an attribute-equipped secret key and an authentication token need to be saved in the storage unit 203 of the user terminal 20 and the storage unit 324 of the second chatbot 32, and a secret key table need not be saved. Note that, if an attribute-equipped secret key has not yet been acquired from the key issuance station 50, only an authentication token is saved. Note that a chatbot ID which is to perform decryption using an attribute-equipped secret key may be associated with a corresponding authentication token (and a corresponding attribute-equipped secret key). For this reason, an attribute-equipped secret key is not associated with a chatbot ID of a conventional chatbot while an attribute-equipped secret key can be associated with a chatbot ID of the chatbot 30. It is thus possible to determine, from a chatbot ID, whether decryption of a message is necessary if the message and the chatbot ID are received from the chat server 10.

Note that conditions other than the above-described conditions related to an attribute-equipped secret key and the condition that the number of key issuance stations 50 be one are assumed to be the same as those in Example 2.

<<Case Where Chatbot Process Starts with Message Transmission by User Terminal 20>>

Figure 9:
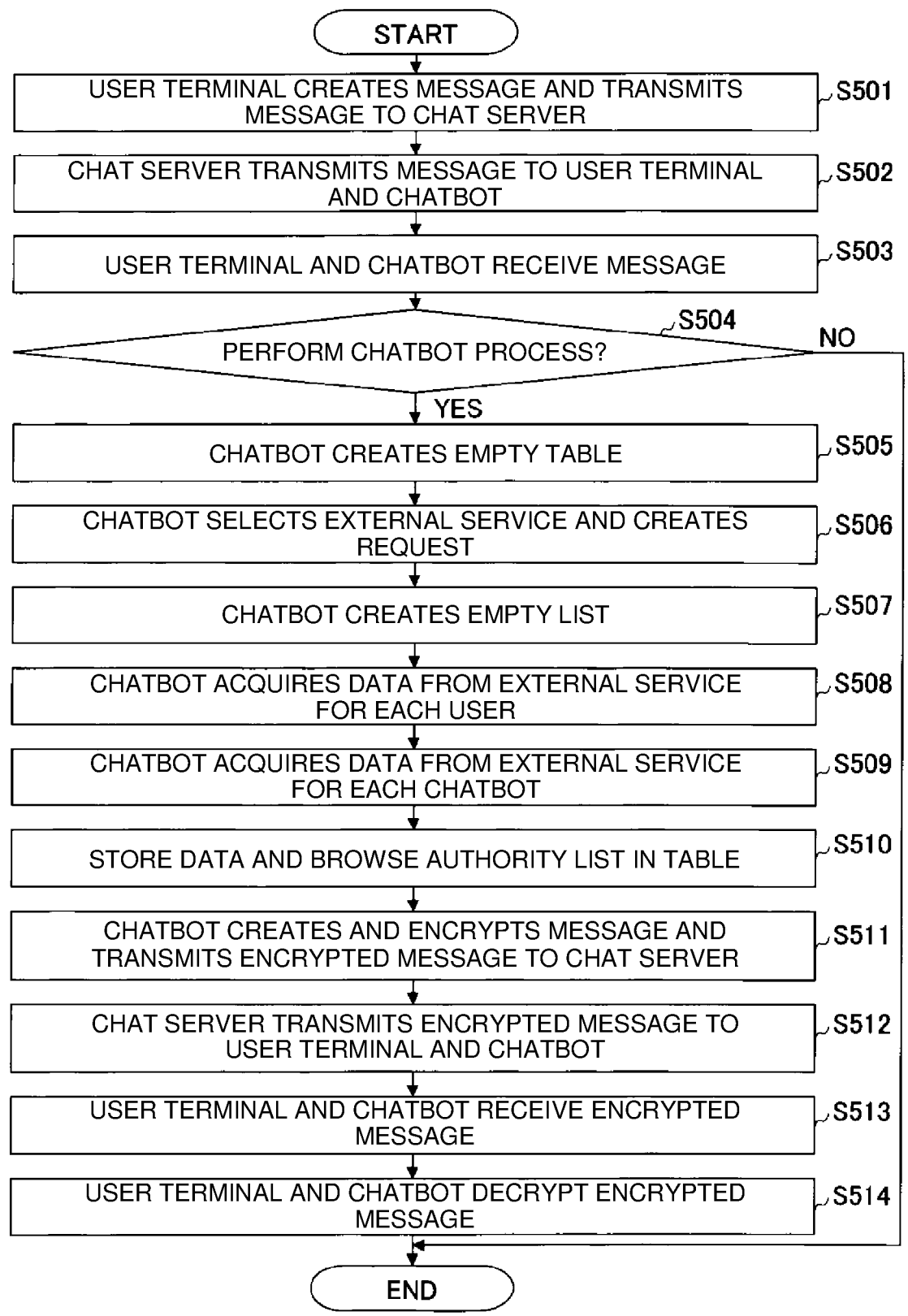
FIG. 9 is a chart for explaining the flow of a case (Example 3) where a chatbot utilization process starts with message transmission by a user terminal.

FIG. 9 is a chart for explaining the flow of a case (Example 3) where a chatbot utilization process starts with message transmission by the user terminal 20. In this case, a series of processes at the time of utilization of a chatbot by the user terminal 20 having a user ID of UID is as follows.

Since steps S501 to S513 are the same as steps S401 to S413 in FIG. 8, a description thereof will be omitted.

Step S514: The users $UID_1$ to $UID_N$ and the chatbots $CID_1$ to $CID_L$ decrypt a message $C_q$. Hereinafter, a case where the user $UID_j$ decrypts $C_q$ will be described in procedural steps 20-1 to 20-5, and a case where the chatbot $CID_j$ that is the second chatbot 32 (i.e., a chatbot with an encryption and decryption function) of the chatbots $CID_1$ to $CID_L$ decrypts $C_q$ will be described in procedural steps 21-1 to 21-5.

Case Where User $UID_j$ Decrypts $C_q$

Procedural Step 20-1: When the decryption processing unit 202 of the user $UID_j$ confirms that the received CID is a chatbot ID, the decryption processing unit 202 acquires an attribute-equipped secret key $sk_j$ which is stored in the storage unit 203.

Procedural Step 20-2: If an attribute-equipped secret key is not stored in the storage unit 203, the decryption processing unit 202 of the user $UID_j$ transmits an authentication token $TK_j$ which is saved in the storage unit 203 and UID to the key issuance station 50.

Procedural Step 20-3: When the key issuance processing unit 501 of the key issuance station 50 receives $UID_j$ and $TK_j$, the key issuance processing unit 501 verifies whether $UID_j$ is valid, using the authentication token $TK_j$. If it is verified that $UID_j$ is valid, the key issuance processing unit 501 obtains an attribute-equipped secret key $sk_{(UID,s)}$ in the same manner as in procedural step 18-3 above.

Procedural Step 20-4: The key issuance processing unit 501 of the key issuance station 50 transmits the attribute-equipped secret key $sk_{(UID,s)}$ to the user $UID_j$.

Procedural Step 20-5: The decryption processing unit 202 of the user $UID_j$ substitutes the attribute-equipped secret key $sk_j$ acquired by procedural step 20-1 above for $sk_{(UID,s)}$ or uses the attribute-equipped secret key $sk_{(UID,s)}$ transmitted in procedural step 20-4 above to decrypt $C_q$ in the same manner as in procedural step 18-5 above, and obtains a message M'.

Case Where Chatbot $CID_j$ Decrypts $C_q$

Procedural Step 21-1: When the decryption processing unit 323 of the chatbot $CID_j$ confirms that the received CID is a chatbot ID, the decryption processing unit 323 acquires an attribute-equipped secret key $sk_j$ which is stored in the storage unit 324.

Procedural Step 21-2: If an attribute-equipped secret key is not stored in the storage unit 324, the decryption processing unit 323 of the chatbot $CID_j$ transmits an authentication token $TK_j$ which is saved in the storage unit 324 and $CID_j$ to the key issuance station 50.

Procedural Step 21-3: When the key issuance processing unit 501 of the key issuance station 50 receives $CID_j$ and $TK_j$, the key issuance processing unit 501 verifies whether $CID_j$ is valid, using the authentication token $TK_j$. If it is verified that $CID_j$ is valid, the key issuance processing unit 501 obtains an attribute-equipped secret key $sk_{(CID,s)}$ in the same manner as in procedural step 19-3 above.

Procedural Step 21-4: The key issuance processing unit 501 of the key issuance station 50 transmits the attribute-equipped secret key $sk_{(CID,s)}$ to the chatbot $CID_j$.

Procedural Step 21-5: The decryption processing unit 323 of the chatbot $CID_j$ substitutes the attribute-equipped secret key $sk_j$ acquired by procedural step 21-1 above for $sk_{(CID,s)}$ or uses the attribute-equipped secret key $sk_{(CID,s)}$ transmitted in procedural step 21-4 above to decrypt $C_q$ in the same manner as in procedural step 19-5 above, and obtains a message M'.

Example 4

A case where respective pieces of proxy authentication information of the external services 40 are the same will be described hereinafter as Example 4. For example, in a case where a single service provider provides a plurality of external services 40, pieces of proxy authentication information of the plurality of external services 40 may be the same for the single user terminal 20.

In the present example, pieces of information to be stored in proxy authentication information tables which are saved in the storage unit 313 of the first chatbot 31 or the storage unit 324 of the second chatbot 32 are different. In the storage unit 313 (or the storage unit 324) of the given chatbot 30 according to Example 2, for example, proxy authentication information tables as shown in Tables 5 and 6 below are saved.

TABLE 5

| User ID | Client ID | Proxy authentication information |
|---------|-----------|----------------------------------|
| $UID_1$ | $OID_{1,1}$ | $Cert_{1,1}$ |
| $UID_2$ | | |
| $UID_3$ | $OID_{1,3}$ | $Cert_{1,3}$ |
| ... | ... | ... |

TABLE 6

| User ID | Client ID | Proxy authentication information |
|---------|-----------|----------------------------------|
| $UID_1$ | $OID_{2,1}$ | $Cert_{2,1}$ |
| $UID_2$ | | |
| $UID_3$ | $OID_{2,3}$ | $Cert_{2,3}$ |
| ... | ... | ... |

Table 5 above is a proxy authentication information table storing pieces of proxy authentication information for an external service $S_1$. Table 6 above is a proxy authentication information table storing pieces of proxy authentication information for an external service $S_1$.

In the above-described case, in the present example, $OID_{1,j}=OID_{2,j}$ and $Cert_{1,j}=Cert_{2,j}$ hold for each j (that is, if user IDs are identical, client IDs and pieces of proxy authentication information are also identical). The same applies to a proxy authentication information table storing a correspondence relationship between a client ID and proxy authentication information for a chatbot ID. Note that although a case where a proxy authentication information table is held for each external service 40 has been described above, since $OID_{1,j}=OID_{2,j}$ and $Cert_{1,j}=Cert_{2,j}$ hold, each chatbot 30 may hold only one proxy authentication information table related to a user ID common to all the external services 40. Similarly, only one proxy authentication information table related to a chatbot ID common to all the external services 40 may be held.

Note that the present example is the same as Example 1 except for the above-described proxy authentication information tables.

Example 5

A case where a time setting method is different from that in Example 2 will be described hereinafter as Example 5. The present example is the same as Example 2 except for an algorithm in an encryption scheme.

In the present example, let IDSET be a set of user IDs and chatbot IDs, and ID be a partial set of IDSET. Let $[0,N_1]=\{0,1,2,\ldots,N_1\}$ where $N_1$ is a positive integer. The present example assumes that an encryption scheme is composed of four algorithms (Setup, KeyGen, Enc, and Dec) and meets the following requirements. Note that k represents a security parameter.

Setup Algorithm: $Setup(1^k) \to (mpk, msk)$

Key Generation Algorithm: for id∈ IDSET and t, KeyGen$(id,t,mpk,msk) \to sk_{(id,t)}$ Encryption Algorithm: for S⊂ID, t, and T that is a positive integer, $Enc(S,t,t+T,mpk,M) \to C_{(S,t,T)}$ where M represents a plain text Decryption Algorithm: $Dec(sk_{(id,t)}, C_{(S,t,T)}) \to M'$ Assume that the encryption scheme meets the following correctness requirement.

$$Pr\left[M = M' \middle| \begin{array}{l} \text{Setup}(1^k) \to (mpk, msk), Enc(S, t, t+T, mpk, M) \to C_{(S,t,t+T)} \\ id \in S, t <= s < t+T, KeyGen(id, s, mpk, msk) \to sk_{(id,s)}, \\ Dec(sk_{(id,s)}, C_{(S,t,t+T)}) \to M' \end{array}\right] = 1$$

The present example is the same as Example 2 except for use of the four algorithms (Setup, KeyGen, Enc, and Dec) (i.e., Example 5 is obtained by replacing the algorithms of Example 2 with the algorithms of the present example).

The present invention is not limited to the above-described embodiment disclosed specifically, and various modifications, changes, combinations, and the like can be made without departing from the description of the claims.

REFERENCE SIGNS LIST

1 Chatbot system
10 Chat server
20 User terminal
31 First chatbot
32 Second chatbot
40 External service
201 Chat processing unit
202 Decryption processing unit
203 Storage unit
311 Chat processing unit
312 Encryption processing unit
313 Storage unit
321 Chat processing unit
322 Encryption processing unit
323 Decryption processing unit
324 Storage unit
401 Key issuance processing unit
402 Storage unit

The invention claimed is:

1. A chatbot system including a plurality of user terminals, a chatbot, and a chat server,
   wherein the chatbot comprises:
   a memory, and
   a processor configured to:
   receive, as an input, a list including a user ID of a user terminal which has utilization authority for data,
   transmit a data acquisition request as a proxy of the user, wherein the data acquisition request specifies the data for acquisition and further includes the user ID,
   cause an external service to determine whether the user ID is associated with viewing permission for the data,
   when the user ID is associated with the viewing permission for the data, cause the external service to transmit the data to the chatbot,
   in response to acquiring the data from the external service, create a message from the data which is acquired from the external service,
   generate a policy-equipped ciphertext by using an encryption algorithm of ciphertext policy attribute-based encryption, and
   transmit the policy-equipped ciphertext to the chat server, and
   each of the user terminals comprises:
   a memory, and
   a processor configured to:
   receive a policy-equipped ciphertext from the chat server, and

[Math. 10]

decrypt the policy-equipped ciphertext using an attribute-equipped secret key which is generated on the basis of a user ID of the user terminal.

2. The chatbot system according to claim 1, wherein the chatbot system includes a key issuance station, and
   the key issuance station comprises:
   a memory, and
   a processor configured to:
   receive, as an input, the user ID of the user terminal, and
   generate the attribute-equipped secret key by a key generation algorithm of ciphertext policy attribute-based encryption.

3. The chatbot system according to claim 2, wherein a policy-equipped ciphertext that is received from the chatbot is saved in the chat server, the processor of the chatbot:
   receives, as inputs, the list I and a time length indicating length of time when decryption is possible and generates the policy-equipped ciphertext by the encryption algorithm, and
   the processor of the key issuance station:
   receives, as inputs, the user ID and a current time and generates the attribute- equipped secret key by the key generation algorithm.

4. The chatbot system according to claim 2, wherein the processor of each of the user terminals po1 generates the attribute-equipped secret key by transmitting the user ID of the user terminal to the key issuance station and decrypts the policy-equipped ciphertext using the generated secret key when the attribute-equipped secret key is absent.

5. The chatbot system according to claim 1, wherein
the chatbot includes a first chatbot and a second chatbot,
the first chatbot comprises the processor of the chatbot, and
the second chatbot comprises the processor of the chatbot, and
a professor configured to: receive a policy-equipped ciphertext from the chat server, and
decrypt the policy-equipped ciphertext using a secret key which is generated on the basis of a chatbot ID of the second chatbot.

6. An information processing method used in a chatbot system including a plurality of user terminals, a chatbot, and a chat server, the method comprising:
receiving, by the chatbot, as an input, a list including a user ID of a user terminal which has utilization authority for data,
transmitting a data acquisition request as a proxy of the user, wherein the data acquisition request specifies the data for acquisition and further includes the user ID,
causing an external service to determine whether the user ID is associated with viewing permission for the data,
when the user ID is associated with the viewing permission for the data, causing the external service to transmit the data to the chatbot,
in response to acquiring the data from the external service, creating, by the chatbot, a message from the data which is acquired from an external service,
generating, by the chatbot, a policy-equipped ciphertext by using an encryption algorithm of ciphertext policy attribute-based encryption,
transmitting, by the chatbot, the policy-equipped ciphertext to the chat server,
receiving, by each of the user terminals, a policy-equipped ciphertext from the chat server and
decrypting, by each of the user terminals, the policy-equipped ciphertext using an attribute-equipped secret key which is generated on the basis of a user ID of the user terminal.

\* \* \* \* \*